United States Patent
Kato et al.

(10) Patent No.: US 11,044,769 B2
(45) Date of Patent: Jun. 22, 2021

(54) WIRELESS COMMUNICATION SYSTEM, WIRELESS RELAY DEVICE AND WIRELESS COMMUNICATION METHOD

(71) Applicant: Panasonic Intellectual Property Management Co., Ltd., Osaka (JP)

(72) Inventors: Osamu Kato, Fukuoka (JP); Yasuhiro Aoyama, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 120 days.

(21) Appl. No.: 16/461,342

(22) PCT Filed: Sep. 21, 2017

(86) PCT No.: PCT/JP2017/034044
§ 371 (c)(1),
(2) Date: May 15, 2019

(87) PCT Pub. No.: WO2018/092412
PCT Pub. Date: May 24, 2018

(65) Prior Publication Data
US 2020/0068632 A1      Feb. 27, 2020

(30) Foreign Application Priority Data
Nov. 18, 2016   (JP) .............................. JP2016-225437

(51) Int. Cl.
*H04W 76/14* (2018.01)
*H04B 7/155* (2006.01)
(Continued)

(52) U.S. Cl.
CPC ............ *H04W 76/14* (2018.02); *H04B 7/155* (2013.01); *H04B 7/15528* (2013.01);
(Continued)

(58) Field of Classification Search
CPC ..... H04W 76/14; H04W 40/18; H04W 40/22; H04W 40/30; H04W 40/38; H04W 72/02;
(Continued)

(56) References Cited

U.S. PATENT DOCUMENTS 7,486,632 B2 * 2/2009 Ookuma ................ H04B 7/155
370/315
9,820,309 B2 * 11/2017 Masini .................. H04W 36/10
(Continued)

FOREIGN PATENT DOCUMENTS

JP      2004-295360 A    10/2004
JP      2007-74177 A      3/2007
(Continued)

OTHER PUBLICATIONS

Hiroshi Furukawa, The Institute of Electronics Information and Communication Engineer, "Hop Count independent Throughput Realization by Intermittent Periodic Transmit of Source Packets in Wireless Multi-hop Network", Technical Report of IEICE, A•P2003-225, RCS2003-231 (Nov. 2003).

*Primary Examiner* — Omar J Ghowrwal
(74) *Attorney, Agent, or Firm* — Seed IP Law Group LLP

(57) ABSTRACT

Provided is a wireless relay device that determines whether or not the wireless relay device has to withdraw from a first wireless multi-hop network to which the wireless relay device itself belong, transmits, in a wireless multi-hop, a request for a connection that uses wireless communication in compliance with a first communication scheme between the wireless relay device and at least one wireless base station, to a wireless base station on the first wireless multi-hop network, according to a result of the determination that the wireless relay device withdraws from the first wireless multi-hop network, and allocates the wireless communication in compliance with the first communication scheme between the wireless relay device and the at least one
(Continued)

wireless base station according to a control signal that is transmitted from the wireless base station on the first wireless multi-hop network.

20 Claims, 14 Drawing Sheets

(51) Int. Cl.
  *H04L 29/08* (2006.01)
  *H04W 40/18* (2009.01)
  *H04W 40/22* (2009.01)
  *H04W 40/30* (2009.01)
  *H04W 40/38* (2009.01)
  *H04W 72/02* (2009.01)
  *H04W 84/18* (2009.01)
  *H04B 7/26* (2006.01)
  *H04W 40/02* (2009.01)
  *H04W 84/22* (2009.01)
  *H04W 88/08* (2009.01)
  *H04W 92/20* (2009.01)

(52) U.S. Cl.
  CPC ........... *H04B 7/2606* (2013.01); *H04L 29/08* (2013.01); *H04W 40/02* (2013.01); *H04W 40/18* (2013.01); *H04W 40/22* (2013.01); *H04W 40/30* (2013.01); *H04W 40/38* (2013.01); *H04W 72/02* (2013.01); *H04W 84/18* (2013.01); *H04W 84/22* (2013.01); *H04W 88/08* (2013.01); *H04W 92/20* (2013.01)

(58) Field of Classification Search
  CPC ..... H04W 84/18; H04W 88/08; H04W 92/20; H04W 40/02; H04W 84/22; H04B 7/155; H04B 7/15528; H04B 7/2606; H04L 29/08
  See application file for complete search history.

(56) References Cited

U.S. PATENT DOCUMENTS

| | | | |
|---|---|---|---|
| 2007/0066312 A1 | 3/2007 | Shomura et al. | |
| 2007/0280188 A1* | 12/2007 | Kang | H04L 5/14 370/338 |
| 2008/0232296 A1* | 9/2008 | Shin | H04B 7/2606 370/315 |
| 2010/0238853 A1* | 9/2010 | Zhou | H04L 45/123 370/315 |
| 2013/0301438 A1 | 11/2013 | Li et al. | |
| 2014/0146739 A1* | 5/2014 | Zhang | H04B 7/15 370/315 |
| 2014/0323136 A1* | 10/2014 | Nakata | H04W 28/0236 455/438 |
| 2015/0237555 A1 | 8/2015 | Kashiwase | |
| 2015/0382392 A1 | 12/2015 | Morita et al. | |
| 2017/0099689 A1 | 4/2017 | Kalhan et al. | |
| 2017/0105164 A1* | 4/2017 | Liu | H04W 40/125 |
| 2019/0302760 A1* | 10/2019 | Katou | H04W 16/32 |

FOREIGN PATENT DOCUMENTS

| | | |
|---|---|---|
| JP | 2007-258982 A | 4/2007 |
| JP | 5200826 B2 | 2/2013 |
| JP | 2015-521423 A1 | 7/2015 |
| WO | 2013/169699 A1 | 11/2013 |
| WO | 2014/050886 A1 | 4/2014 |
| WO | 2014/129453 A1 | 8/2014 |
| WO | 2015/191586 A1 | 12/2015 |

* cited by examiner

WIRELESS COMMUNICATION SYSTEM, WIRELESS RELAY DEVICE AND WIRELESS COMMUNICATION METHOD

TECHNICAL FIELD

The present disclosure relates to a wireless communication system in which a connection for a wireless multi-hop communication is made for communication among multiple wireless relay devices and data transfer is performed, a wireless relay device that relays data from a wireless terminal and transfers the data, and a wireless communication method.

BACKGROUND ART

In recent years, there has been an increasing demand for wirelessly communicating various pieces of data between a mobile body apparatus, such as a working robot, a vehicle, an unmanned aerial vehicle (UAV) such as a drone, or a wearable camera that a guard or a report in a television (TV) relay broadcast spot who wears, and a core network such as the Internet. It is also considered that in this data wireless communication, a mobile body that is equivalent to a wireless terminal is caused to be connected to an existing cellular system (for example, Long Term Evolution (LTE)) such as 3G or 4G. However, when using this cellular system, an amount of data transfer is large, and thus communication fees increase excessively and a case unsuitable for the use is also found.

Particularly, in the case of an area (for example, a disaster scene, a university campus, a site owned by a corporate organization, such as a company, a large-sized parking lot), to a very small portion of which a moving range of the mobile body is limited, in most cases, it is also desirable that the mobile body is accommodated which uses a non-cellular system that employs a wireless Local Area Network (LAN) such as Wi-Fi® (in other words, is desirable that the data transfer is possible).

Nevertheless, a coverage area of the wireless LAN such as Wi-Fi®, for example, is such that a cell radius is as small as several tens of meters. For this reason, in some cases, a method is considered in which many wireless LAN base stations (hereinafter also referred to as "access points") are installed as stations, in which a small number of access points of them are connected directly to a core network using an optical line or the like, and in which the remaining many access points are connected indirectly to the core network using a wireless multi-hop communication. Accordingly, the time taken for installing of the optical line and the cost of doing so can be further reduced compared with a case where all access points are connected directly to the core network. The wireless multi-hop communication is a technology in which, without establishing a wired communication infrastructure, a wireless communication terminal transfers packets of any other wireless communication terminal in a bucket relay manner and in which wireless communication is thus possibly performed in a wide area.

In a technology in which data is delivered using wireless multi-hop communication, for example, in PTL 1, when a path for the wireless multi-hop communication that is periodically performed is established, a wireless terminal that establishes a path from a data transmission terminal to a data reception terminal and a wireless terminal that is positioned at a distance within M (a value that is set uniquely for a network) hops from the data reception terminal are set as one portion of the path, and data transfer is performed. More precisely, it is disclosed that data reception is also possible within M hops from the data reception terminal, that is, in the vicinity of the data reception terminal. Accordingly, regarding multicast data delivery over a wireless multi-hop communication network, in a case where the data reception terminal moves, data reception without interruption is also possible. In PTL 1, in a case where, for example, a data relay terminal moves, a path for the wireless multi-hop communication is dynamically reconfigured, and thus data communication is established between the data transmission terminal and the data reception terminal.

Nevertheless, the reconfiguration of the path for the wireless multi-hop communication is difficult to realize within several tens of milliseconds (ms). Due to a restriction of using the wireless multi-hop communication, a delay time that is allowed for transfer of data, such as image data, or of a control signal is several tens of milliseconds (ms). Therefore, for this purpose, it is unsuitable to use the data relay terminal. The purpose described above, for example, corresponds to a purpose of remotely operating a movement of the working robot as the data relay terminal, or a purpose of remotely operating driving of an autonomous vehicle as the data relay terminal.

Furthermore, in a case where, while the data relay terminal moves, a high transfer speed is needed as is the case with image data transfer, it is assumed that the re-establishment of the path for the wireless multi-hop communication is possibly realized from the perspective of the allowable delay time described above. However, in this case, when the number of hops for the wireless multi-hop communication at the time of the transfer of a large amount of data (for example, the transfer of the image data) increases because the wireless multi-hop communication is used, a system capacity (more precisely, a total value of an amount of traffic that is handled by the data relay terminal) increases in the data relay terminal. For this reason, there is a likelihood that the use efficiency of a radio resource will deteriorate and that throughput will decrease. For example, in a case where 10 Mbyte (megabytes) data is transferred and this data reaches the data reception terminal using four-hops wireless multi-hop communication, in a wireless space, 40 Mbyte data is transferred, and 10 Mbyte arrives for the first time. Thus, in most cases, the radio resource is unnecessarily used. Furthermore, in a case where a moving range of the data relay terminal that makes up the path for the wireless multi-hop communication is wide and where any other data relay terminal that makes up the path for the wireless multi-hop communication is not present nearby, there is a likelihood that data communication between the data relay terminal having a wide moving and a core network that is connected to the wireless multi-hop network will be interrupted.

An object of the present disclosure is to switch suitably between wireless multi-hop withdrawal and non-withdrawal communication according to an environmental information at the time of communication, in which a path for wireless multi-hop communication is established, to conform to purposes at the time of the communication that requires a low delay time, to continue data communication with a core network that is connected to a wireless multi-hop network, even if wireless multi-hop communication withdrawal takes place, and to suppress a deterioration in the use efficiency of a radio resource.

CITATION LIST

Patent Literature

PTL 1: Japanese Patent Unexamined Publication No. 2007-258982
PTL 2: Japanese Patent Unexamined Publication No. 2004-295360

SUMMARY OF THE INVENTION

According to an aspect of the present disclosure, there is provided a wireless communication system in which multiple wireless relay devices that relay pieces of data which are transmitted from different wireless terminals, and at least one wireless base station that possibly performs wireless communication in compliance with a first communication scheme between the wireless base station and each of the wireless relay devices make up at least one wireless multi-hop network and are communicably connected, in which the wireless relay device includes a determination unit that determines whether or not the wireless relay device withdraws from a first wireless multi-hop network to which the wireless relay device itself belongs, and a communication unit that, due to a result of the determination by the determination unit that the wireless relay device has to withdraw from the first wireless multi-hop network, transmits a request for a connection that uses the wireless communication in compliance with the first communication scheme between the wireless relay device and the at least one wireless base station to a wireless base station on the first wireless multi-hop network, using wireless multi-hop communication, and in which according to the request for the connection, the wireless base station on the first wireless multi-hop network controls performing of allocation of the wireless communication in compliance with the first communication scheme between the at least one wireless base station and the wireless relay device.

According to another aspect of the present disclosure, there is provided a wireless relay device that relays data which is transmitted from a wireless terminal, makes up at least one wireless multi-hop network between the wireless relay device and at least one wireless base station that possibly performs wireless communication in compliance with a first communication scheme, and is communicably connected to the at least one wireless base station, the wireless relay device including: a determination unit that determines whether or not the wireless relay device withdraws from a first wireless multi-hop network to which the wireless relay device itself belongs; a communication unit that, due to a result of the determination by the determination unit that the wireless relay device has to withdraw from the first wireless multi-hop network, transmits a request for a connection that uses the wireless communication in compliance with the first communication scheme between the wireless relay device and the at least one wireless base station to a wireless base station on the first wireless multi-hop network, using wireless multi-hop communication; and a control unit that allocates the wireless communication in compliance with the first communication scheme between the wireless relay device and the at least one wireless base station, according to a control signal that is transmitted from the wireless base station on the first wireless multi-hop network according to the request for the connection.

According to the present disclosure, switching can take place suitably between wireless multi-hop withdrawal and non-withdrawal communication according to an environmental information at the time of communication, in which a path for wireless multi-hop communication is established, conforming to purposes at the time of the communication that requires a low delay time can take place, data communication with a core network that is connected to a wireless multi-hop network can be continued even if wireless multi-hop communication withdrawal takes place, and a deterioration in the use efficiency of a radio resource can be suppressed.

DESCRIPTION OF EMBODIMENTS

Figure 1:
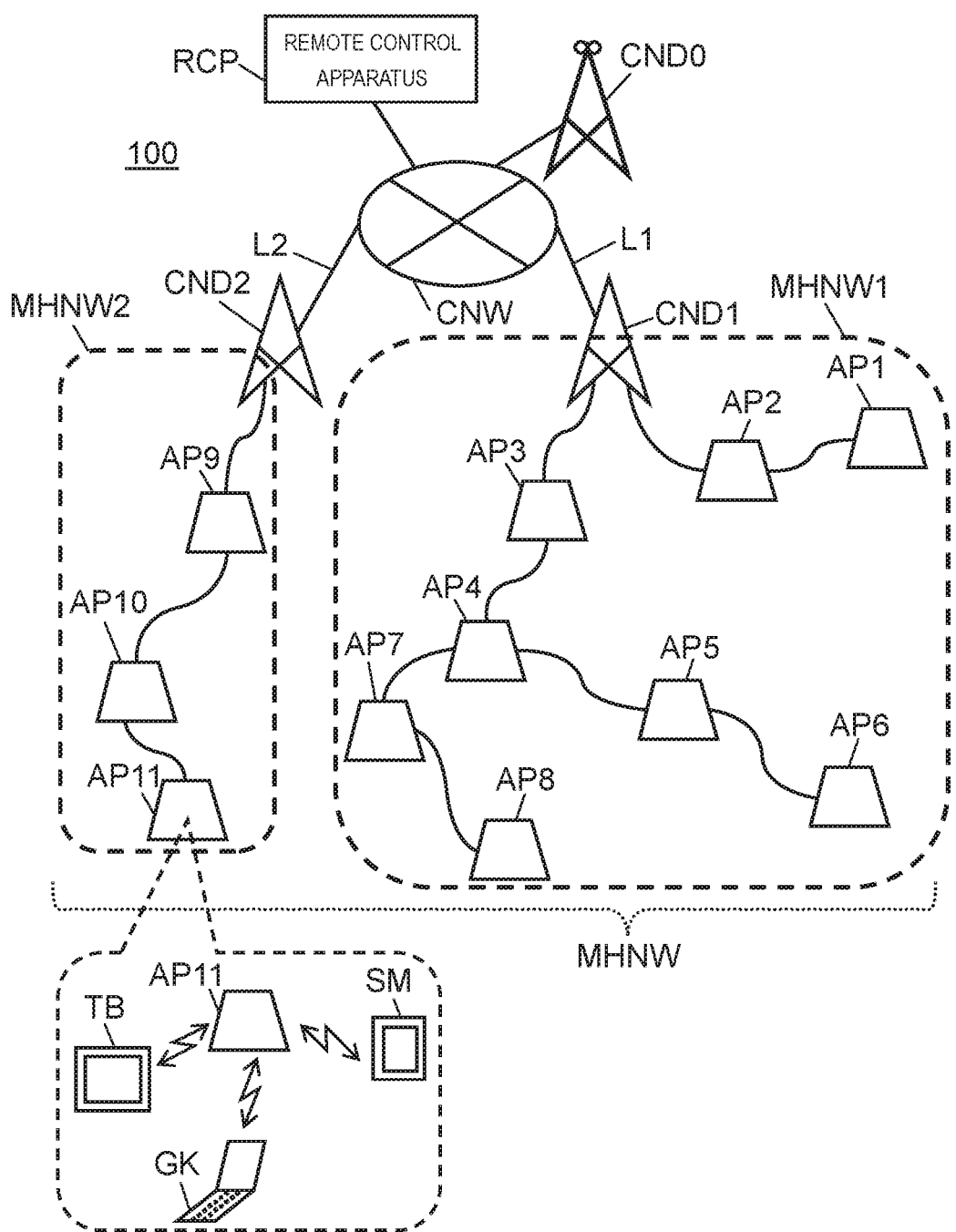
FIG. 1 is a diagram of an example of a systematic configuration of a wireless communication system according to the present embodiment.

A wireless relay device, a program, a wireless communication system, and a wireless communication method according to the present invention of the present invention will be described in detail below, suitably referring to the drawings. However, in some cases, a description more detailed than necessary is omitted. For example, in some cases, a detailed description of an already-known matter is omitted, or a description of substantially the same configuration is repeated. The reason for this is to avoid unnecessary redundancy of the following description and to help a person of ordinary skill in the art to achieve easy understanding. The accompanying drawings and the following description are provided in order for a person of ordinary skill in the art to get a sufficient understanding of the present disclosure, and therefore, this is not intended to impose a limitation on a subject matter that is recited in a claim.

<Configuration of the Wireless Communication System>

First, a configuration of wireless communication system 100 is described with reference to FIG. 1.

FIG. 1 is a diagram illustrating an example of a systematic configuration of wireless communication system 100 according to the present embodiment.

As illustrated in FIG. 1, wireless communication system 100 is configured to include multiple mobile access points, mobile access points AP1 and so forth up to AP11 (examples of a wireless relay device), which, with wireless multi-hop communication, relay pieces of transfer data that are transmitted from different wireless terminals (for example, portable telephone GK, smartphone SM, and tablet terminal TB), respectively, and at least one of core nodes CND0, CND1, and CND2 (examples of a wireless base station) that possibly perform wireless communication with mobile access points AP1 to AP 11, respectively, in a first communication scheme (for example, a single hop (one hop)). Mobile access points AP1 to AP11 and core nodes CND0, CND1, and CND2 make up at least one of wireless multi-hop networks MHNW, MHNW1, and MHNW2, are communicably connected. In the following description, all mobile access points AP1 to AP 11 that make up wireless communication system 100 that is illustrated in FIG. 1 are described below as having a likelihood of moving (more precisely, roaming). In other words, a total of 11 mobile access points, mobile access points AP1 to AP11, may all move, and in some cases, of the total of 11 mobile access points, mobile access points AP 1 to AP11, one or several mobile access points, or most mobile access points may be installed fixedly and thus may not move.

More specifically, mobile access points AP1 and AP2 are communicably connected to core node CND1 with wireless multi-hop communication (for example, wireless multi-hop communication that uses a Local Area Network (LAN)), and mobile access points AP3, AP4, AP5, AP6, AP7, and AP8 are communicably connected to core node CND1 with the wireless multi-hop communication (for example, the wireless multi-hop communication that uses the wireless LAN). In other words, with mobile access points AP1 to AP8 and core node CND1, wireless multi-hop network MHNW1 is formed, and this wireless multi-hop network MHNW1 is managed by core node CND1.

In the same manner, mobile access points AP9, AP10, and AP11 are communicatively connected to core node CND2 with the wireless multi-hop communication (for example, the wireless multi-hop communication that uses the wireless LAN). In other words, wireless multi-hop network MHNW2 is formed with mobile access points AP9 to AP11 and core node CND2, and this wireless multi-hop network MHNW2 is managed by core node CND2. Furthermore, a wide-area wireless multi-hop network MHNW that is managed by core node CND0 is formed with wireless multi-hop networks MHNW1 and MHNW2.

With the wireless multi-hop communication, mobile access point AP1 transfers transfer data from a wireless terminal that is accommodated in mobile access point AP1 itself, to mobile access point AP2.

With the wireless multi-hop communication, mobile access point AP2 transfers the transfer data from mobile access point AP1 and transfer data from a wireless terminal that is accommodated in mobile access point AP2 itself, to core node CND1.

With the wireless multi-hop communication, mobile access point AP3 transfers transfer data from mobile access point AP4 and the transfer data from a wireless terminal that is accommodated in mobile access point AP3 itself, to core node CND1.

With the wireless multi-hop communication, mobile access point AP4 transfer transfers data from each of mobile access points AP5 and AP7 and transfer data from a wireless terminal that is accommodated in mobile access point AP4 itself, to mobile access point AP3.

With the wireless multi-hop communication, mobile access point AP5 transfers transfer data from mobile access point AP6 and transfer data from a wireless terminal that is accommodated in mobile access point AP5 itself, to mobile access point AP4.

With the wireless multi-hop communication, mobile access point AP6 transfers transfer data from a wireless terminal that is accommodated in mobile access point AP6 itself, to mobile access point AP5.

With the wireless multi-hop communication, mobile access point AP7 transfer transfers data from mobile access point AP8 and transfer data from a wireless terminal that is accommodated in mobile access point AP7 itself, to mobile access point AP4.

With the wireless multi-hop communication, mobile access point AP8 transfers transfer data from a wireless terminal that is accommodated in mobile access point AP8 itself, to mobile access point AP7.

With the wireless multi-hop communication, mobile access point AP9 transfers transfer data from mobile access point AP10 and transfer data from a wireless terminal that is accommodated in mobile access point AP9 itself, to core node CND2.

With the wireless multi-hop communication, mobile access point AP10 transfers transfer data from mobile access point AP11 and transfer data from a wireless terminal that is accommodated in mobile access point AP10 itself, to mobile access point AP9.

With the wireless multi-hop communication, mobile access point AP11 transfers transfer data from a wireless terminal that is accommodated in mobile access point AP11 itself, to mobile access point AP10.

Details of internal configurations of mobile access points AP1 to AP11 are the same and will be described with reference to FIGS. 2 and 3. Details of internal configurations of core nodes CND0, CND1, and CND2 are the same and are described below with reference to FIG. 4. An example is illustrated in which in wireless communication system 100 that is illustrated in FIG. 1, 11 mobile access points are installed as stations, 3 core nodes are installed as stations, and where two wireless multi-hop network sets are formed, but this is done for easy-to-understand description. It goes without saying that each of the number of mobile access points, the number of core nodes installed as stations, and the number of formed wireless multi-hop networks is not limited.

Mobile access points AP1 to AP11 are, for example, mobile body apparatuses, such as working robots, vehicles, unmanned aerial vehicles (UAV) such as drones, or wearable cameras that guards or reporters in TV relay broadcast spots wear, and relay transfer data from at least one wireless terminal (for example, portable telephone GK, smartphone SM, and tablet terminal TB) that is an accommodation target. More precisely, each of mobile access points AP1 to AP11 transfers transfer data that has to be relayed, to a communication partner that is determined by any one of core nodes CND0, CND1, and CND2 when establishing a path for a wireless multi-hop network to which the mobile access point belongs. Therefore, in the present embodiment, a mobile body apparatus, such as a working robot, a vehicle, an unmanned aerial vehicle such as a drone, or a wearable camera that a guard or a reporter in a TV relay broadcast spot wears is handled as a moving access point, instead of a wireless terminal in the wireless LAN (WLAN). Accordingly, the mobile access point does not perform handover between access points in the wireless LAN.

Core nodes CND1 and CND2 are wireless base stations that possibly provide a macro-cell having a comparatively large cell radius, and can perform wireless communication with mobile access points APk (refer to FIG. 2) that are present within the macro-cell, which complies with the first communication scheme (for example, a single hop (one hop)). In the following description, it is assumed that the macro-cell refers to a communication zone (a cell) that has a comparatively large cell radius and that is accommodable with the wireless communication in compliance with the first communication scheme (for example, a signal hop (one hop)) from the mobile access point. Furthermore, core nodes CND1 and CND2 are wireless base stations that possibly provide a small cell having a comparatively small cell radius, and can perform the wireless multi-hop communication with mobile access point APk (refer to FIG. 2) within the small cell. In the following description, it is assumed that the small cell refers to a communication zone (a cell) that has a comparatively small cell radius and that is accommodable by the wireless multi-hop communication from the mobile access point. Moreover, core nodes CND1 and CND2 are also connected to core network CNW with wired line L1 and L2 such as an optical line and performs wired communication with core node CND0 that manages wireless multi-hop network MHNW.

Core node CND0 generally manages wireless multi-hop network MHNW that is made up of wireless multi-hop network MHNW1 in which a communication path is established (formed) by core node CND1, and wireless multi-hop network MHNW2 in which a communication path is established (formed) by core node CND2. Core node CND0 may generally manage any other wireless multi-hop network (not illustrated) that is formed by any other core node (not illustrated) which is connected to core network CNW.

Core network CNW, for example, is established as a network (for example, the Internet), high speed data communication over which is possible, such as an optical line that uses optical fiber.

Furthermore, mobile access point APk (refer to FIG. 2) may be connected to any one of core nodes CND1 and CND2 that are connected with the wireless communication in compliance with the first communication scheme (for example, a single hop (one hop)) or the wireless multi-hop communication, through core network CNW, in a manner that makes possible data communication with remote control apparatus RCP. In other words, remote control apparatus RCP is communicably connected to core network CNW through any one of core nodes CND1 and CND2, in a manner that makes possible the data communication with mobile access point APk (refer to FIG. 2).

Remote control apparatus RCP receives transfer data (for example, sensor detection data, camera image data, positional information, or speed information, which is described below) that is transmitted from mobile access point APk (refer to FIG. 2). Remote control apparatus RCP may be configured using a normal personal computer instead of a server computer. With the operation of remote control apparatus RCP by a remote operator, remote control apparatus RCP generates a control signal for remotely causing mobile access point APk (refer to FIG. 2) to perform at least one of movement or processing, according to the detail of the transfer data that is transmitted from mobile access point APk (refer to FIG. 2), and transmits the control signal to mobile access point APk (refer to FIG. 2). An internal configuration of remote control apparatus RCP, for example, is possible with a known technology that is based on a control center in FIG. 2 in PTL 2, and thus a description thereof is omitted.

For example, in a case where mobile access point APk is a vehicle, remote control apparatus RCP includes a steering sensor, an accelerator sensor, and a brake sensor, and acquires pieces of data that are detected by the steering sensor, the accelerator sensor, and the brake sensor. Remote control apparatus RCP computes an amount of steering control, an amount of accelerator control, and an amount of brake control that are optimal when mobile access point APk (refer to FIG. 2) is remotely caused to travel autonomously, according to transfer data that is transmitted from mobile access point APk (refer to FIG. 2) or pieces of detection data that are obtained by the steering sensor, the accelerator sensor, and the brake sensor of remote control apparatus RCP itself. Remote control apparatus RCP generates a control signal that includes the amount of steering control, the amount of accelerator control, and the amount of brake control, and transmits the generated control signal to mobile access point APk (refer to FIG. 2). Accordingly, mobile access point APk (refer to FIG. 2), can perform the autonomous traveling in accordance with the control signal from remote control apparatus RCP. Furthermore, remote control apparatus RCP may have a display. For example, the display is configured with a front view display, an inside-vehicle view display, and a rear view display. Displayed on the display is camera image data obtained by an on-board camera, which is transmitted from a vehicle (an example of the mobile access point). With the camera image data that is displayed on the display, the remote operator of remote control apparatus RCP can know specifically and visually a situation that occurs when driving mobile access point APk (refer to FIG. 2) in a remote place. For example, in the same manner as a driver's seat (not illustrated) of an actual vehicle (an example of the mobile access point), a seat on which the remote operator sits is equipped with a steering wheel, an accelerator pedal, and a brake pedal. With the steering sensor, the accelerator pedal, and the brake pedal, it is possible that an amount of operation of each of these is detected.

For example, in a case where, for example, mobile access point APk is a working robot, an unmanned aerial vehicle such as a drone, or a wearable camera that a guard or a reporter in a TV relay broadcast spot wears, remote control apparatus RCP may be a remote controller for remotely performing an operation of causing this mobile body apparatus to perform at least one (for example, operation processing, such as welding, autonomous traveling processing, in-flight processing, such as forward movement, circling, upward movement, downward movement, or backward movement, or imaging processing by a camera) of movement or processing. With the operation by the remote operator, remote control apparatus RCP generates a control signal for an instruction to perform at least one of the movement or the processing by the mobile body apparatus and transmits the generated control signal to mobile access point APk (refer to FIG. 2). Accordingly, mobile access point APk (refer to FIG. 2) can perform the movement in accordance with the control signal from remote control apparatus RCP or can perform the processing in accordance with the control signal.

The wireless single hop communication (one-hop communication) and the wireless multi-hop communication (multi-hop communication), which are used in wireless communication system 100 according to the present embodiment are briefly described here. The one-hop communication and the multi-hop communication are conceptually in contract with each other. The one-hop communication refers to communication in which single mobile access point APk (refer to FIG. 2) directly transfers data in one hop (more precisely, relay such as one-degree data transfer) between single mobile access point APk itself and any one of core nodes CND1 and CND2, without receiving transfer data from any other mobile access point. On the other hand, the multi-hop communication refers to communication in which data is transferred in a multi-hop (more precisely, relay such as multiple-times data transfer) between mobile access points APk (refer to FIG. 2) or between mobile access point APk (refer to FIG. 2) and any one of core nodes CND1 and CND2. For example, communication between mobile access point AP2 and core node CND1, between mobile access point AP3 and core node CND1, or between mobile access point AP9 and core node CND2 is the multi-hop communication, instead of the one-hop communication.

Next, a hardware configuration of mobile access point APk is described in detail with reference to FIG. 2.

Figure 2:
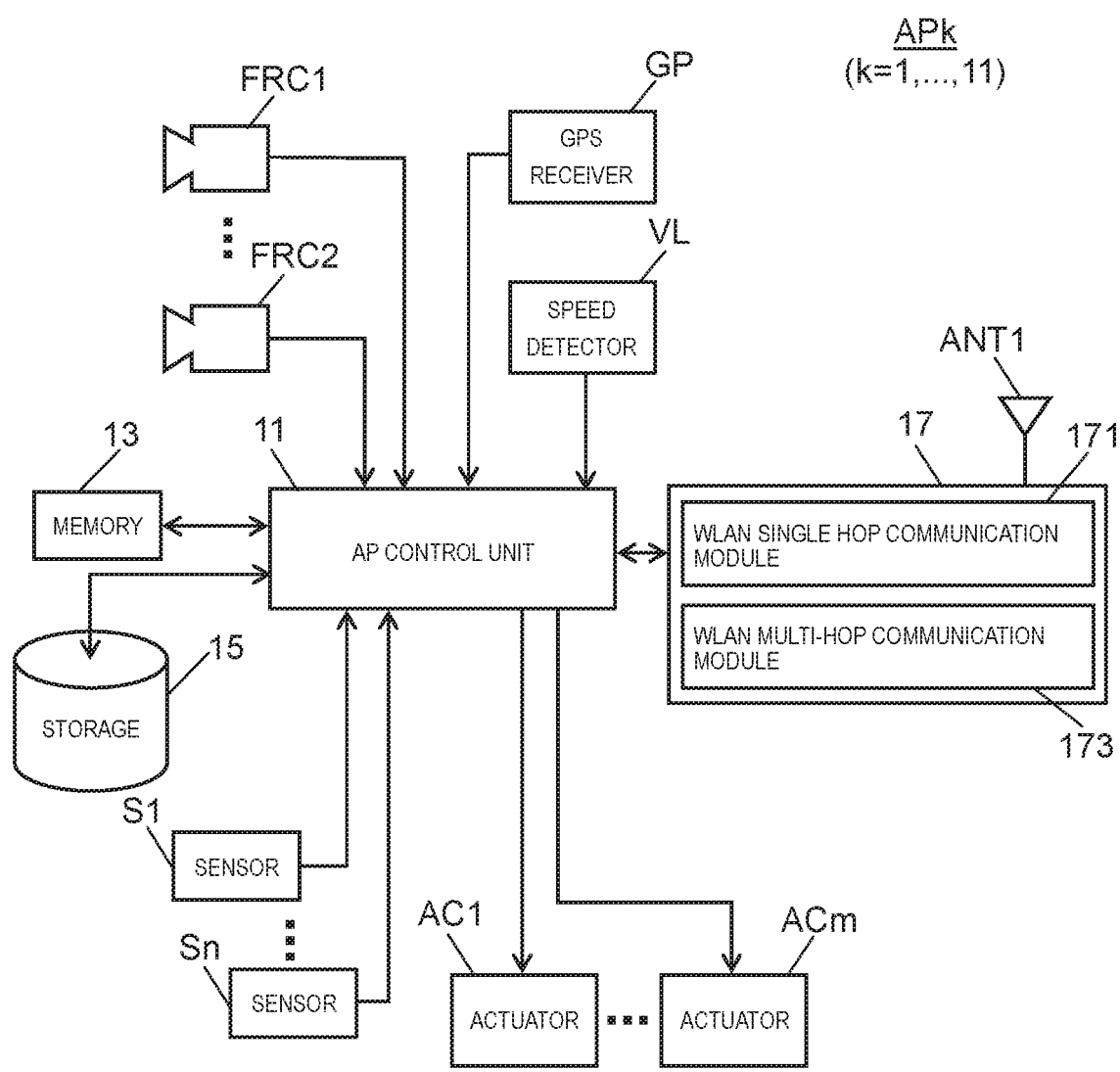
FIG. 2 is a block diagram illustrating in detail an example of a hardware configuration of a mobile access point according to the present embodiment.

FIG. 2 is a block diagram illustrating in detail an example of the hardware configuration of mobile access point APk according to the present embodiment.

Mobile access point APk is configured to include at least one camera (for example, camera FRC1 or FRC2), access point (AP) control unit 11, memory 13, storage 15, communication unit 17, GPS receiver GP, speed detector VL, n (n is an integer that is equal to or greater than 2) sensors S1, and so forth up to Sn, and m (m is an integer that is equal to or greater than 2) actuators AC1, and so forth up to ACm. In FIG. 2, two cameras, cameras FRC1 and FRC2 are installed, but one camera (for example, only camera FRC1) may be installed.

Cameras FRC1 and FRC2 capture an image of what appears in front of mobile access point APk (for example, a mobile body apparatus, such as a working robot, a vehicle, an unmanned aerial vehicle such as a drone, or a wearable camera that a guard or a reporter in a TV relay broadcast spot wears) and outputs data of the captured image to AP control unit 11. The working robot, for example, is an autonomously traveling robot that senses ambient temperature or $CO_2$ concentration and runs about. Furthermore, in a case where, for example, mobile access point APk is a vehicle, cameras FRC1 and FRC2 are installed in the vicinity of front glass (not illustrated) of the vehicle. Furthermore, cameras FRC1 and FRC2 may capture images of what appears in front of and of what appears in rear of a driver's seat of the vehicle. In this case, cameras FRC1 and FRC2 are installed in the vicinity of a headrest side (not illustrated) of the driver's seat of the vehicle.

AP control unit 11, for example, is configured using a processor (for example, a Central Processing Unit (CPU), a Micro Processing Unit (MPU), or Digital Signal Processor (DSP)). AP control unit 11 functions as the control unit of mobile access point APk, and for example, performs control processing for generally controlling operation of each of the units of mobile access point APk, processing that inputs and outputs data into and from each of the units of mobile access point APk, processing that computes (calculates) data, and processing that stores data. AP control unit 11 operates according to a program and data that are stored in memory 13. The program and the data are ones that define operation of mobile access point APk as an example of the wireless relay device according to the present invention.

For example, AP control unit 11 acquires various pieces of sensor detection data from sensor S1 to Sn, or various pieces of camera image data from cameras FRC1 and FRC2. For example, AP control unit 11 acquires a control signal (for example, a control signal for remotely-controlled operation or processing by mobile access point APk) that is transmitted from the remote control apparatus RCP, drives various actuators, actuators AC1 to ACm, based on the control signal, and controls the operation and the processing by mobile access point APk. An example of a specific software configuration of AP control unit 11 will be described below with reference to FIG. 3.

For example, memory 13 is configured using a Random Access Memory (RAM) and a Read Only Memory (ROM), and a program and data that define an operation are stored in the ROM. Furthermore, memory 13 is used as a working memory (a RAM) when various processing operations such as arithmetic operations are performed in AP control unit 11.

Storage 15, for example, is configured with a Hard Disk Drive (HDD) or a Solid State Drive (SSD) and is a device for storing various pieces data that is in mobile access point APk. For example, various pieces of sensor detection data from sensors S1 to Sn or various pieces of camera image data from cameras FRC1 and FRC2, positional information from GPS receiver GP, and speed information from speed detector VL are stored in storage 15.

Communication unit 17 has WLAN single hop communication module 171 and WLAN multi-hop communication module 173. Communication unit 17 performs the data communication with any one of any other mobile access point APk, and core nodes CND1 and CND2, using any of these communication modules and antenna ANT1.

WLAN single hop communication module 171 is a communication module for performing the data communication, using the first communication scheme (for example, single hop communication) between mobile access point APk itself and any one of core node CND1 and CND2 that possibly provide a macro-cell in compliance with non-cellular-based wireless standards (for example, a wireless LAN (WLAN) such as Wi-Fi®. It is preferable that, for example, frequencies available for one-hop communication over the wireless LAN, which are in a 4.9 GHz band that is stipulated in the Institute of Electrical and Electronics Engineers (IEEE) 802.11j, are used in Japan. This frequency band increases a transfer distance and is different from the wireless multi-hop communication. Because of this, suppression of signal inference is possible.

WLAN multi-hop communication module 173 is a communication module for performing the data communication, using the wireless multi-hop communication with any other mobile access point APk that possibly provides a small cell into contact with the non-cellular-based wireless standards (for example, the wireless LAN (WLAN) such as Wi-Fi®. It is preferable that, for example, frequencies available for the wireless multi-hop communication over the wireless LAN, which are in a 5.35 GHz band that is stipulated in IEEE 802.11a, are used in Japan.

In FIG. 2, it is illustrated that only a single antenna ANT1 is provided in mobile access point APk, but multiple antennas ANT1 may be provided in communication unit 17. Communication unit 17 may switch to antennas ANT1 that are to be used, according to the module that is used for communication. For example, communication unit 17 uses a first antenna and a second antenna when using WLAN single hop communication module 171 and when using WLAN multi-hop communication module 173, respectively.

Global Positioning System (GPS) receiver GP receives multiple signals that indicate the time and a position (coordinates) of each of the GPS satellites, which are transmitted from multiple navigation satellites (more precisely, GPS satellites). The GPS receiver GP, as an example of an acquisition unit, calculates the positions (more precisely, a position of mobile access point APk) of the GPS receivers (GP) based on the multiple signals that are received. GPS receiver GP may be provided within AP control unit 11. GPS receiver GP outputs positional information on mobile access point APk, which is obtained by the calculation, to AP control unit 11. The calculation of the positional information by GPS receiver GP may be performed by AP control unit 11 instead of GPS receiver GP. In this case, input into AP control unit 11 are the pieces of information that indicate the time and the position of each of the GPS satellite, which are included in the multiple signals that are received by the GPS receiver GP.

Sensors S1 to Sn (n is an integer that is equal to or greater than 2), as an example of the acquisition unit, detect and acquire pieces of environmental information (in other words, information on mobile access point APk itself and information relating to the vicinity of mobile access point APk) (the same is hereinafter true), respectively, that are used to specify states of mobile access points APk. Sensors S1 to Sn output pieces of data that are detected (hereafter referred to as "sensor detection data") to AP control unit 11. Any one of sensors S1 to Sn, for example, may be configured using an existing radar device or a distance measurement device that uses infrared light, and detects a distance up to an object (for example, an obstacle) that is present in front of mobile access point APk, as an example of the sensor detection data. Furthermore, any one of sensors S1 to Sn, for example, may be configured using a temperature sensor, and detects temperature in the vicinity of mobile access point APk. Furthermore, any one of sensors S1 to Sn, for example, may be configured using a humidity sensor, and detects humidity in the vicinity of mobile access point APk. Furthermore, any one of sensors S1 to Sn may be configured using a gas sensor that detects $CO_2$ concentration or the like, and detects $CO_2$ concentration in the vicinity of mobile access point APk. It goes without saying that gas which is a target that is detected by the gas sensor is not limited to $CO_2$.

Speed detector VL detects and acquires a moving speed of mobile access point APk1. Speed detector VL outputs data on the detected moving speed to AP control unit 11. In a case where mobile access point APk, for example, is a vehicle, speed detector VL detects a speed of the vehicle (more precisely, a wheel speed). In a case where mobile access point APk, for example, is a wearable camera that a guard or a report in a TV relay broadcast spot wears, speed detector VL detects a speed that is equivalent to a speed (for example, a walking speed or a running speed) of the guard or the reporter. In a case where mobile access point APk, for example, is a working robot, speed detector VL detects a moving speed of the working robot. In a case where mobile access point APk, for example, is an unmanned aerial vehicle such as a drone, speed detector VL detects a flying speed of the unmanned aerial vehicle.

Based on the control signal from AP control unit 11, actuators AC1 to ACm control driving of each component (for example, a motor, a rotary wing, a switch, a steering wheel, an engine, and a brake) within mobile access point APk for performing the remotely-controlled movement or processing by mobile access point APk (for example, a mobile body apparatus, such as a working robot, a vehicle, an unmanned aerial vehicle such as a drone, or a wearable camera that a guard or a report in a TV relay broadcast spot wears). In a case where mobile access point APk, for example, is a vehicle, actuator AC1 controls a rotation angle of the actuator and thus adjusts an angle of wheels (for example, front wheels on the left and right side) of the vehicle. Furthermore, another actuator controls an engine throttle valve (not illustrated) and thus adjusts revolutions per minute of the engine (not illustrated). Furthermore, by hydraulic control of the brake, another actuator adjusts a braking force of the vehicle. Furthermore, by pressure-applying control of the brake, another actuator (for example, actuator ACm) switches between turning on and turning off a tail lamp (not illustrated). In a case where mobile access point APk, for example, is a vehicle, a steering wheel designates a steering angle of wheels (front wheels on the left and right sides) of the vehicle when the vehicle travels. In a conventional-type normal driving method in which a driver (a so-called operator) gets in the vehicle and controls driving of the vehicle, the driver turns the steering wheel in such a manner as to make a steering angle that is desired. On the other hand, in wireless communication system 100 according to the present embodiment, regardless of whether or not the driver (a so-called operator) gets in the vehicle as an example of mobile access point APk, a rotation angle of the steering wheel is controlled by driving of the actuator (for example, actuator AC1) that is based on the control signal from AP control unit 11. The rotation angle of the steering wheel, for example, is included in a control signal for remotely-controlled autonomous traveling of the vehicle, which is transmitted from remote control apparatus RCP.

In the description that is provided with reference to FIG. 2, mobile access point APk has cameras FRC1 and FRC2, and images that are captured by cameras FRC1 and FRC2 are transmitted to any other mobile access point or core node. However, mobile access point APk may not necessarily have cameras FRC1 and FRC2. Because mobile access point APk is positioned a distance away from an area covered by a wireless multi-hop network to which mobile access point APk itself belongs, data cannot be accommodated in the wireless multi-hop network and the data communication with core network CNW that is connected to the wireless multi-hop network is interrupted. Wireless communication system 100 according to the present embodiment solves this problem. For this reason, mobile access point APk performs the wireless communication with any one of core nodes CND1 and CND2 that are connected to core network CNW, which complies with the first communication scheme (for example, a single hop (one hop)). However, although will be described in detail below, as a condition for the mobile access point APk to switch a communication scheme from the wireless multi-hop communication to the first communication scheme (for example, a single hop (one hop)), mobile access point APk may not necessarily have cameras FRC1 and FRC2, or mobile access point APk may not necessarily perform data transfer of the images that are captured by cameras FRC1 and FRC2. For example, even when mobile access point APk is positioned far from the area covered by the wireless multi-hop network to which mobile access point APk itself currently belongs, the inclusion as the condition for switching the described communication scheme is possible, and at this time, mobile access point APk may have neither of cameras FRC1 and FRC2.

Figure 3:
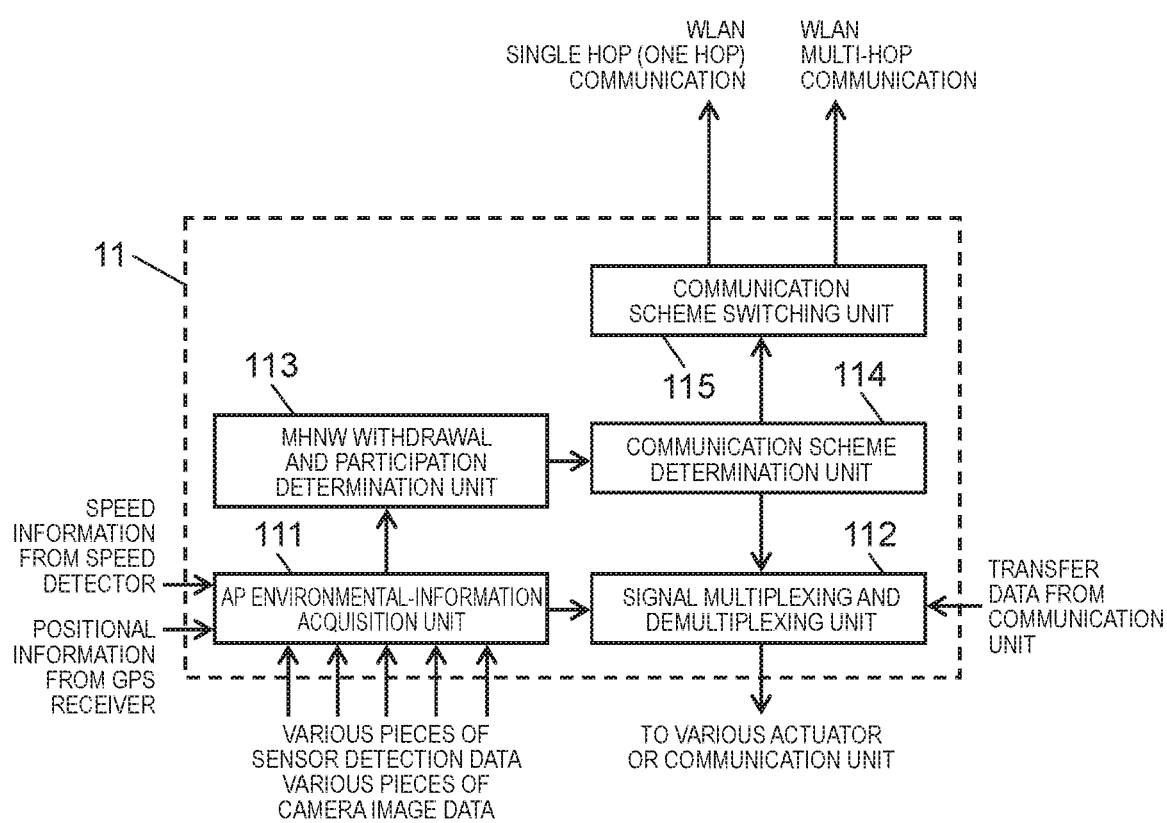
FIG. 3 is a block diagram illustrating in detail an example of a software configuration of an AP control unit according to the present embodiment.

FIG. 3 is a block diagram illustrating in detail an example of a software configuration of AP control unit 11 according to the present embodiment.

AP control unit 11 is configured to include AP environmental-information acquisition unit 111, signal multiplexing and demultiplexing unit 112, multi-hop network (MHNW) withdrawal and participation determination unit 113, communication scheme determination unit 114, and communication scheme switching unit 115. AP environmental-information acquisition unit 111, signal multiplexing and demultiplexing unit 112, multi-hop network (MHNW) withdrawal and participation determination unit 113, communication scheme determination unit 114, and communication scheme switching unit 115 each are configured using a processor (for example, a CPU, an MPU or a DSP).

AP environmental-information acquisition unit 111 as an example of the acquisition unit acquires environmental information on mobile access point APk.

The environmental information on mobile access point APk, for example, includes at least one of the sensor detection data that is detected by each of sensors S1 to Sn, the camera image data that is captured by each of cameras FRC1 and FRC2, the positional information on mobile access point APk, which is computed by GPS receiver GP, and the speed information on mobile access point APk, which is detected by speed detector VL. AP environmental-information acquisition unit 111 outputs the environmental information on mobile access point APk to signal multiplexing and demultiplexing unit 112 and the MHNW withdrawal and participation determination unit 113.

Signal multiplexing and demultiplexing unit 112 multiplexes the environmental information on mobile access point APk from AP environmental-information acquisition unit 111 (for example, codes the camera image data), according to the communication scheme that is determined by communication scheme determination unit 114, and outputs the multiplexed information to communication unit 17. Furthermore, signal multiplexing and demultiplexing unit 112 demultiplexes (for example, decodes) the transfer data (for example, the control signal that is transmitted from remote control apparatus RCP) from communication unit 17, and, according to a result of the demultiplexing processing, outputs the decoded transfer data to various actuators, actuators AC1 to ACm.

Based on the environmental information on mobile access point APk, MHNW withdrawal and participation determination unit 113 as an example of the determination unit determines always or periodically whether or not mobile access point APk (more precisely, which one of wireless multi-hop networks MHNW1 and MHNW2) (the same is hereinafter true) has to withdraw from the wireless multi-hop network to which mobile access point APk itself currently belongs. MHNW withdrawal and participation determination unit 113 outputs a result of the determination to communication scheme determination unit 114. The environmental information that is used for the determination by MHNW withdrawal and participation determination unit 113, for example, is the camera image data, but is not limited to the camera image data.

In the present embodiment, there are two cases where mobile access point APk has to withdraw from the wireless multi-hop network to which mobile access point APk itself belongs. One is a case where mobile access point APk can make a determination on its own. The other is a case where mobile access point APk cannot make the withdrawal determination on its own, but where a core node on the wireless multi-hop network to which mobile access point APk itself currently belongs (more precisely, any one of core nodes CND1 and CND2) (the same is hereinafter true) makes the withdrawal determination.

First, the former case (more precisely, the case where it is possible that mobile access point APk makes the withdrawal determination on the on its own) is described.

The case where mobile access point APk can determinate on its own that mobile access point APk has to withdraw from the wireless multi-hop network to which mobile access point APk itself currently belongs, for example, refers to a case where mobile access point APk itself determines that a transfer delay time in the wireless multi-hop communication cannot satisfy an allowable delay time at the time of the communication. More precisely, according to whether or not a timing for transmitting the camera image data (data of the image that is captured by the camera) comes, MHNW withdrawal and participation determination unit 113 determines whether or not mobile access point APk has to withdraw from the wireless multi-hop network to which mobile access point APk itself currently belongs. For example, a case is considered where, when some type of incidence (an emergency, an event, or an accident) occurs, depending on a determination by a remote operator who always or periodically observes the camera image data that is transmitted by mobile access point APk to remote control apparatus RCP, remote control apparatus RCP causes mobile access point APk to perform the remotely-controlled movement or processing in accordance with the incident in a short time. In other words, remote control apparatus RCP is in a state of causing mobile access point APk to perform the remotely-controlled operation or processing that requires low latency. In this manner, in a case where the camera image data is transmitted to remote control apparatus RCP and where an instruction to perform the remotely-controlled operation or processing from remote control apparatus RCP is received, low latency communication that requires a short allowable delay time is needed. Because of this, MHNW withdrawal and participation determination unit 113 determines that mobile access point APk has to withdraw from the wireless multi-hop network to which mobile access point APk itself belongs.

On the other hand, in a case where mobile access point APk that itself withdrew one time from the wireless multi-hop network, for example, determines that the transfer delay time in the wireless multi-hop communication can satisfy the allowable delay time at the time of the communication, MHNW withdrawal and participation determination unit 113 determines that mobile access point APk has to participate in the wireless multi-hop network (more precisely, the original wireless multi-hop network) to which mobile access point APk itself belonged before the withdrawal. In this case, mobile access point APk performs processing that is to be performed in a normal state where the remotely-controlled operation or processing that requires the low latency does not need to be performed.

Next, the latter case (more precisely, the case where it is not possible that mobile access point APk makes the withdrawal determination on its own, but where the core node on the wireless multi-hop network to which mobile access point APk itself currently belongs makes the withdrawal determination) will be described.

Mobile access point APk always or periodically repeat to transmit the environmental information on the mobile access point APk to the core node on the wireless multi-hop network. Based on the environmental information on mobile access point APk, the core node on the wireless multi-hop network to which mobile access point APk currently belongs always or periodically determines whether or not mobile access point APk has to withdraw from the wireless multi-hop network. For example, the core node determines that mobile access point APk withdraws from the wireless multi-hop network, in a case where mobile access point APk is positioned so far from the area covered by the wireless multi-hop network that mobile access point APk is not on the communication path along the wireless multi-hop network to which mobile access point APk itself currently belongs, or in a case where it cannot be predicted that mobile access point APk is going to move farther away from the area. Examples of this include a case where a guard who wears a wearable camera as a mobile access point is positioned far from the area covered by the wireless multi-hop network and a case where the guard is going to move to a remote location. For example, the positional information on mobile access point APk is used for the determination that the mobile access point APk is positioned far from the area, and the speed information on mobile access point APk is used for the determination that the guard is going to move to the remote location.

On the other hand, based on the environmental information from mobile access point APk that withdrew one time from the wireless multi-hop network, the core node may determine whether or not mobile access point APk has to participate in the wireless multi-hop network (more precisely, the original wireless multi-hop network) to which mobile access point APk belonged before the withdrawal. For example, the core node determines that mobile access point APk has to participate in the wireless multi-hop network, in a case where mobile access point APk returns into the area covered by the wireless multi-hop network (more precisely, the original wireless multi-hop network) to which mobile access point APk itself belonged before the withdrawal, or in a case where mobile access point APk is going to approach the area. For example, the positional information on mobile access point APk is used for the determination that mobile access point APk returns into the area covered by the wireless multi-hop network, and the speed information on mobile access point APk is used for the determination that mobile access point APk is going to approach the area.

Based on a result of the determination by MHNW withdrawal and participation determination unit 113, communication scheme determination unit 114 determines a wireless communication scheme that is used by mobile access point APk, and outputs a result of the determination to signal multiplexing and demultiplexing unit 112 and communication scheme switching unit 115.

For example, according to the result of the determination that mobile access point APk has to withdraw from the wireless multi-hop network to which mobile access point APk itself currently belongs, using the first communication scheme (for example, the single hop communication), communication scheme determination unit 114 determines that communication with the core node on the wireless multi-hop network to which mobile access point APk itself currently belongs, or with a core node on any other wireless multi-hop network (more precisely, a wireless multi-hop network to which mobile access point APk itself does not currently belong) is performed. In other words, communication scheme determination unit 114 allocates the first communication scheme (for example, the single hop communication) to the communication with the core node on the core node on the wireless multi-hop network to which mobile access point APk itself currently belongs, or with a core node on any other wireless multi-hop network (more precisely, a wireless multi-hop network to which mobile access point APk itself does not currently belong). Communication scheme determination unit 114 may preferentially determine that the communication with the core node on the wireless multi-hop network to which mobile access point APk itself currently belongs is performed. Accordingly, load on processing that is necessary for recombination (reestablishment) of communication paths along the wireless multi-hop network, which accompanies the withdrawal of mobile access point APk is reduced compared with a case where mobile access point APk communicates with a node on any other wireless multi-hop network.

For example, according to the result of the determination that mobile access point APk has to participate in the wireless multi-hop network to which mobile access point APk itself currently belongs, using the wireless multi-hop communication, communication scheme determination unit 114 determines that the communication with the core node on the wireless multi-hop network (more precisely, the original wireless multi-hop network) to which mobile access point APk itself belonged before the withdrawal, or with any other mobile access point that belongs to the wireless multi-hop network is performed. In other words, communication scheme determination unit 114 allocates the wireless multi-hop communication to the communication with the core node on the wireless multi-hop network (more precisely, the original wireless multi-hop network) that mobile access point APk itself belonged before the withdrawal, or with any other mobile access point.

A method of determining the communication partner for the wireless multi-hop communication by mobile access point APk over the wireless multi-hop network is realized with a known technology, but, for example, may be determined as follows. For example, the core node transmits a measurement signal (refer to a description that will be provided below) by broadcasting and receives a received electric field strength (for example, Received Signal Strength Indicator (RSSI)) in each mobile access point, of such a signal. Based on a magnitude or the like of the received electric field strength of the signal, the core node establishes (forms) a communication path along the wireless multi-hop network and transmits a control signal for allocation of a scheme for communication with a new communication partner, to each of the mobile access points. Mobile access point APk can set and recognize a new communication partner according to notification of the control signal from the core node.

According to the result of the determination of communication scheme determination unit 114, communication scheme switching unit 115 switches to a wireless communication scheme that is used by mobile access point APk. Specifically, when mobile access point APk withdraws from the wireless multi-hop network (for example, wireless multi-hop network MHNW1) to which mobile access point APk itself currently belongs, communication scheme switching unit 115 switches to a communication scheme that is used for the single hop communication with a core node (for example, any of core nodes CND1 and CND2) as a new communication connection destination. When mobile access point APk participates (re-participates) in the wireless multi-hop network (more precisely, the original wireless multi-hop network) (for example, wireless multi-hop network MHNW1) to which mobile access point APk itself belonged before the withdrawal, communication scheme switching unit 115 switches to a communication scheme that is used for the wireless multi-hop communication with a core node (for example, core node CND1) as a new communication connection destination or any other mobile access point.

Figure 4:
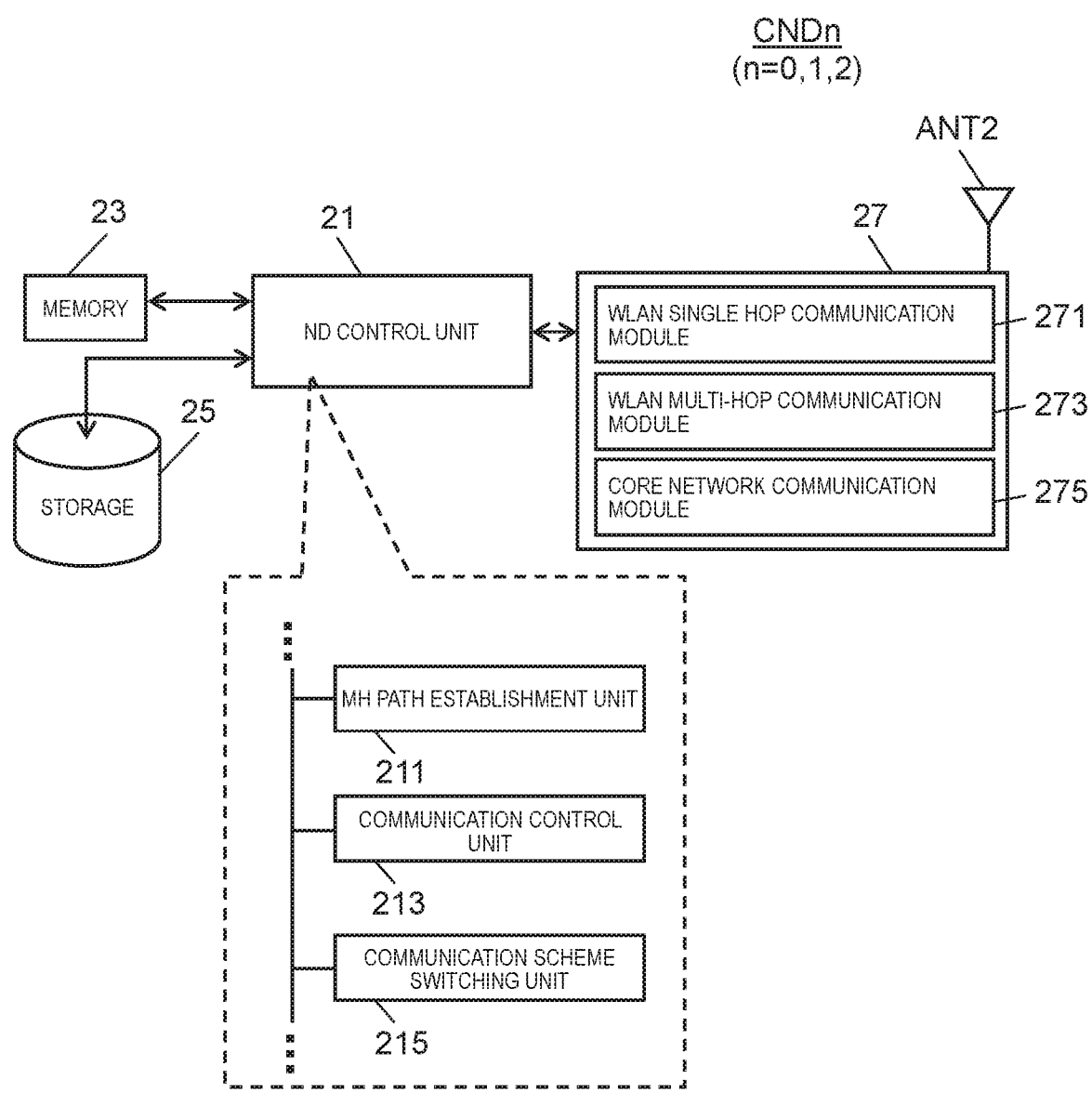
FIG. 4 is a block diagram illustrating in detail an example of a hardware configuration of a core node according to the present embodiment.

FIG. 4 is a block diagram illustrating in detail an example of a hardware configuration of core node CNDn according to the present embodiment. n is 0, 1, or 2.

Core node CNDn is configured to include core node CNDn, node (ND) control unit 21, memory 23, storage 25, and communication unit 27.

ND control unit 21 is configured using a processor (for example, a CPU, an MPU, or DSP). ND control unit 21 functions as a control unit of core node CNDn and performs control processing for generally controlling operation of each of the units of core node CNDn, processing that inputs and output data into and from each of the units of core node CNDn, processing that computes (calculates) data, and processing that stores data. ND control unit 21 operates according to a program and data that are stored in memory 23. The program and the data are ones that define operation of core node CNDn as an example of a wireless base station that makes up the wireless communication system according to the present invention.

ND control unit 21 is configured to include at least multi-hop (MH) path establishment unit 211, communication control unit 213, and communication scheme switching unit 215.

MH path establishment unit 211 periodically establishes a communication path (an MH path) between multiple mobile access points APk that belongs to the wireless multi-hop network which is managed by core node CNDn itself. It is possible that processing MH path establishment unit 211, which establishes the communication path (the MH path), for example, is realized by a known technology, and a detailed thereof is omitted. Information on a mobile access point that belongs to the wireless multi-hop network that is established by MH path establishment unit 211 is stored in memory 23 or storage 25.

For example, by broadcasting, MH path establishment unit 211 transmits a signal for detecting a radio wave reception situation, to multiple mobile access points APk that belong to the wireless multi-hop network that is managed by core node CNDn itself, or are present in the neighborhood, through communication unit 27. MH path establishment unit 211 received and acquires the received electric field strength (for example, the RSSI) in each mobile access point, of the measurement signal from each mobile access point. Based on the magnitude of the received electric field strength in each mobile access point, MH path establishment unit 211 establishes (forms) a tree of communication paths (MH paths) that are optimal (for example, communication paths on which interference occurs least frequently when transmitting and receiving a signal). The closer the mobile access point is present to the core node, the higher value the received electric field has, and the farther the mobile access point is present from the core node, and the lower value the received electric field has. Therefore, MH path establishment unit 211 of core node CND1 (n=1), for example, can establish wireless multi-hop network MHNW1 that includes mobile access points AP1, AP2, AP3, AP4, AP5, AP6, AP7, and AP8 (refer to FIG. 1). In the same manner, MH path establishment unit 211 of core node CND2 (n=2), for example, can establish wireless multi-hop network MHNW2 that includes mobile access points AP9, AP10, and AP11 (refer to FIG. 1).

Communication control unit 213 has a memory (not illustrated). In the memory of communication control unit 213, for management, communication control unit 213 controls which one of the wireless communication in compliance with the first communication scheme (for example, a single hop (one hop)) and the wireless multi-hop communication is used for a mobile access point that is a direct communication partner, among mobile access points that belongs to the wireless multi-hop network that is managed by core node CNDn. A conception is introduced in which the mobile access point is either a direct communication partner is a mobile access point that performs direct communication using a single hop communication (one-hop communication), or a mobile access point that performs direct communication using the wireless multi-hop communication. The same is hereinafter true.

Figure 7:
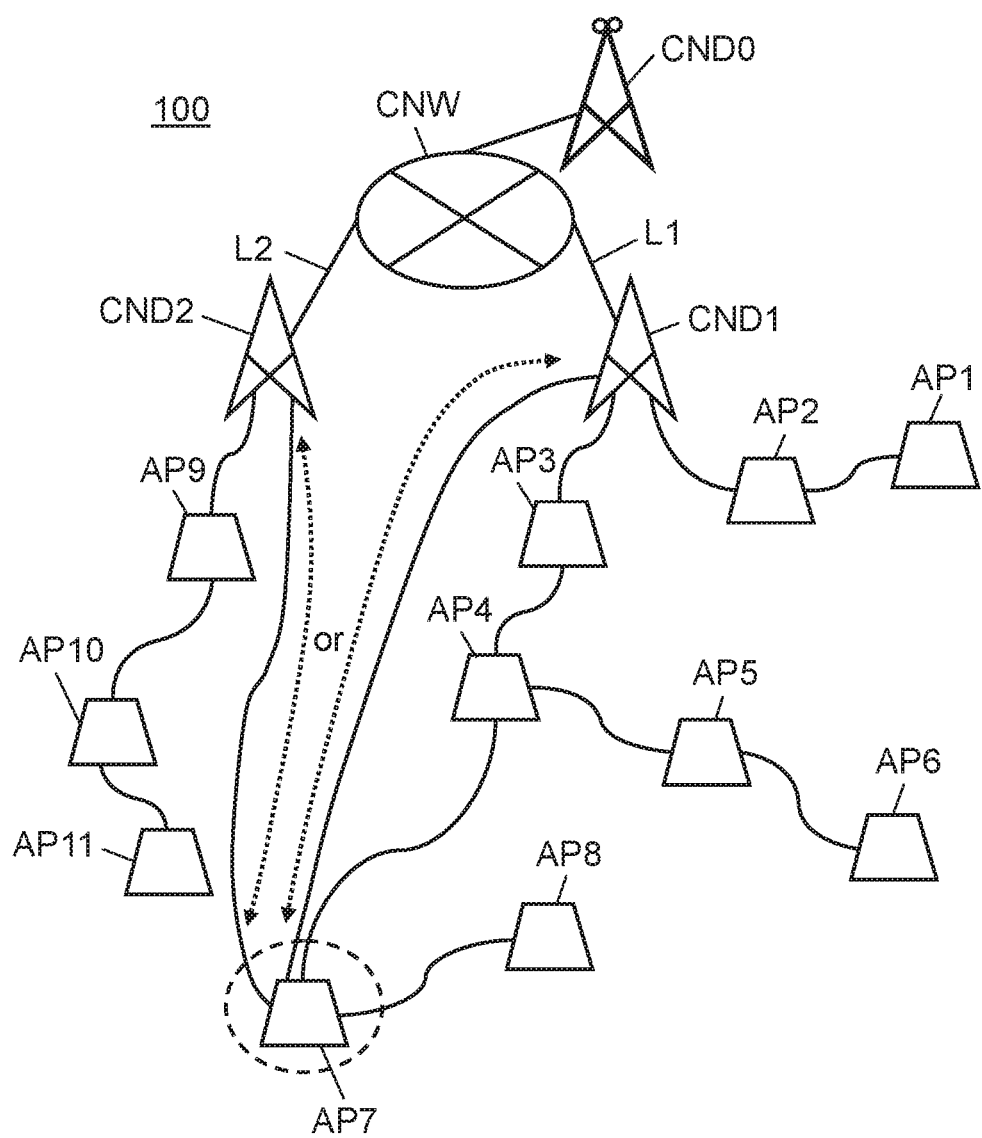
FIG. 7 is a diagram for describing the outline of the operation that is performed when the mobile access point according to the present embodiment withdraws from the wireless multi-hop network.
Figure 8:
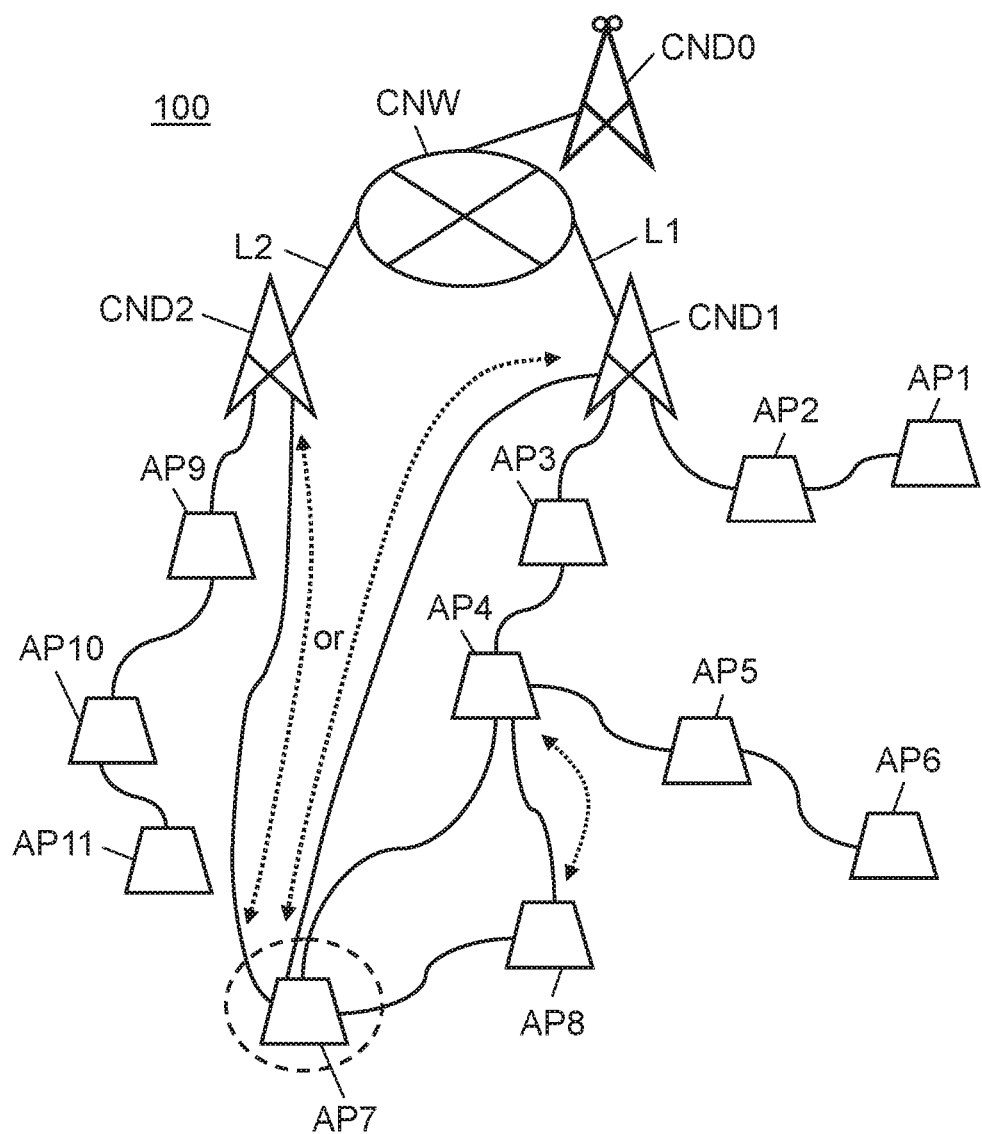
FIG. 8 is a diagram for describing the outline of the operation that is performed when the mobile access point according to the present embodiment withdraws from the wireless multi-hop network.

Based on a result of processing (more precisely, information relating to the communication partner of each mobile access point that belongs to the wireless multi-hop network) by MH path establishment unit 211, communication scheme switching unit 215 switches to a wireless communication scheme that is used by core node CNDn itself, for every mobile access point that is a direct communication partner of core node CNDn. Specifically, in a case where it is determined by MH path establishment unit 211 that the wireless multi-hop communication is used between core node CNDn itself and a mobile access point (for example, mobile access point AP3) that belongs to the wireless multi-hop network (for example, wireless multi-hop network MHNW1), communication scheme switching unit 215 maintains the use of WLAN multi-hop communication module 273 or switches to the use of WLAN multi-hop communication module 273 between core node CNDn itself and mobile access point AP3. Furthermore, in a case where it is determined by MH path establishment unit 211 that a single hop (one hop) communication is used between core node CNDn itself and a mobile access point (for example, mobile access point AP7) (refer to FIG. 7) that newly belongs to the wireless multi-hop network (for example, wireless multi-hop network MHNW2), communication scheme switching unit 215 maintains the use of WLAN single hop communication module 271 or switches to the use of WLAN single communication module 271 between core node CNDn itself and mobile access point AP7. Moreover, in a case where communication is performed between core node CNDn itself and remote control apparatus RCP, communication scheme switching unit 215 maintains the use of core network communication module 275 or switches to the use of core network communication module 275.

Memory 23, for example, is configured using a RAM and a ROM. Stored in the ROM are a program and data that define operation of core node CNDn as an example of the wireless base station that makes up the wireless communication system according to the present invention. Furthermore, memory 23 is used as a working memory (a RAM) when various processing operations such as arithmetic operations are performed in ND control unit 21.

Storage 25, for example, is configured using an HDD or an SSD and is a device in core node CNDn for storing various pieces of data. For example, various pieces of environmental information on each mobile access point APk (for example, various pieces of sensor detection data from sensors S1 to Sn or various pieces of camera image data from cameras FRC1 and FRC2, positional information from GPS receiver GP, and speed information from speed detector VL) are stored in storage 25.

Communication unit 27 has WLAN single hop communication module 271, WLAN multi-hop communication module 273, and core network communication module 275. Using a communication module of any of these and antenna ANT2, Communication unit 27 performs the data communication with any other communication apparatus (for example, any other core node or remote control apparatus RCP) that is connected to mobile access point APk or core network CNW.

WLAN single hop communication module 271 is a communication module for providing a macro-cell in compliance with the non-cellular-based wireless standards (for example, the wireless LAN(WLAN) such as Wi-Fi® and for performing the data communication using the first communication scheme (for example, a single hop communication) between core node CNDn itself and mobile access point APk that is an accommodation target in the macro-cell.

WLAN multi-hop communication module 273 is a communication module for providing a small cell in compliance with the non-cellular-based wireless standards (for example, the wireless LAN(WLAN) such as Wi-Fi® and for performing data communication using the wireless multi-hop communication between core node CNDn itself and mobile access point APk that is an accommodation target in the small cell.

Core network communication module 275 is a communication module for performing the data communication using the wired communication between core node CNDn itself and a communication apparatus (for example, any other core node or remote control apparatus RCP) that is connected to core network CNW.

In FIG. 4, only antenna ANT2 is illustrated as being provided in core node CNDn, but multiple antennas ANT2 may be provided in communication unit 27. Communication unit 27 may switch to antennas ANT2 that is to be used, according to the module that is used for communication. For example, communication unit 27 uses a first antenna and a second antenna when using WLAN single hop communication module 271 and when using WLAN multi-hop communication module 273, respectively.

<Operation of the Wireless Communication System>

Next, operation of wireless communication system 100 according to the present embodiment will be described with reference to FIGS. 5 to 14. Examples of the operation of wireless communication system 100 according to the present embodiment include an example in which the mobile access point withdraws from the wireless multi-hop network to which the mobile access point itself currently belongs and an example in which the mobile access point participates in the pre-withdrawal (more precisely, original) wireless multi-hop network from which the mobile access point withdrew one time.

Figure 14:
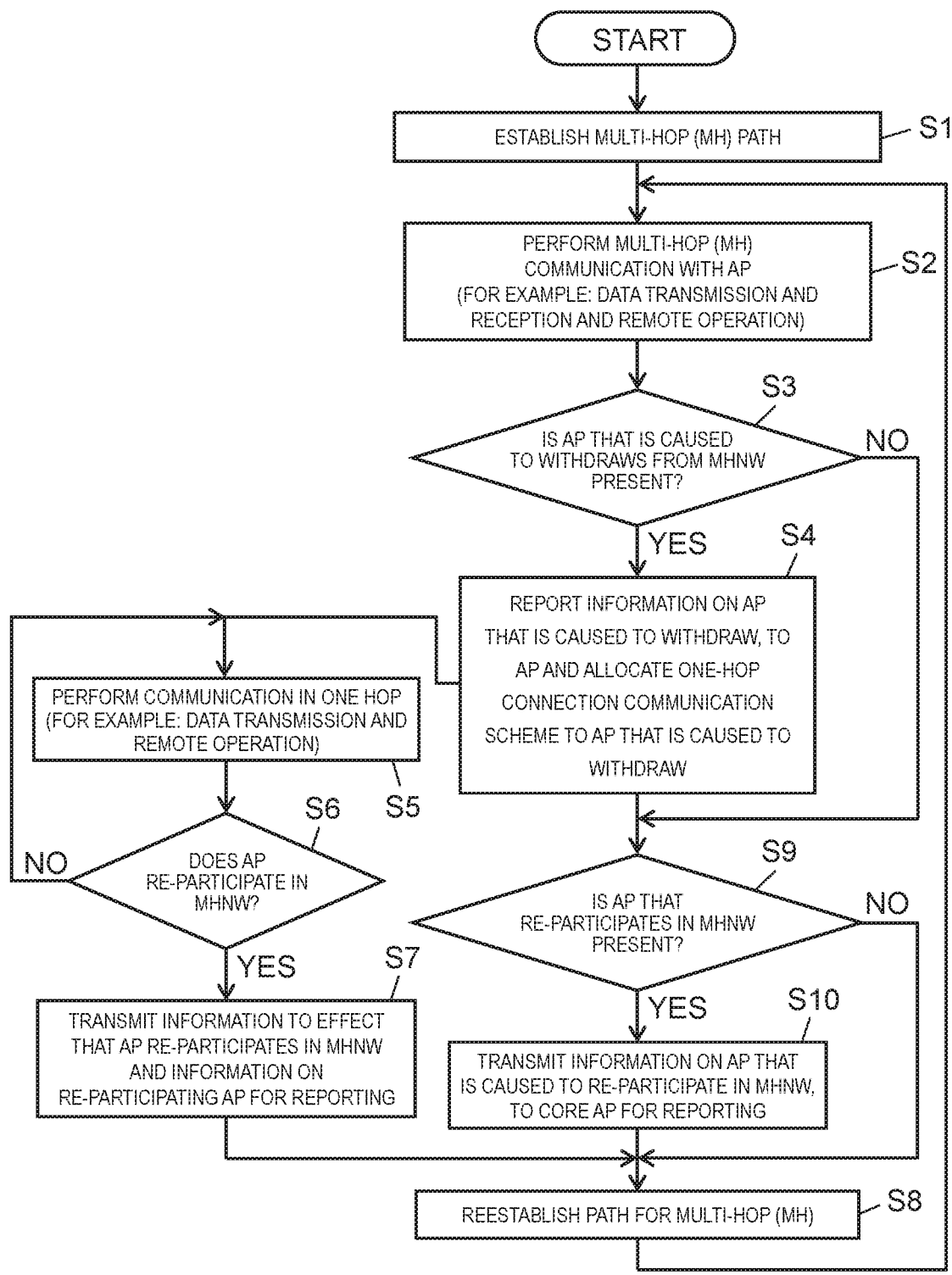
FIG. 14 is a flowchart for describing in detail an example of a procedure of operation of the wireless communication system according to the present embodiment.

FIGS. 5 to 9 are diagrams for describing an outline of an operation that is performed when mobile access point AP7 according to the present embodiment withdraws from wireless multi-hop network MHNW1. FIGS. 10 to 13 are diagram for describing an outline of an operation that is performed when mobile access point AP7 according to the present embodiment participates in wireless multi-hop network MHNW1. FIG. 14 is a flowchart for describing in detail an example of a procedure of the operation of wireless communication system 100 according to the present embodiment. The operation of wireless communication system 100 will be described below in time sequence with reference to FIG. 14, and, when necessary, suitably with reference to FIGS. 5 to 13.

Figure 5:
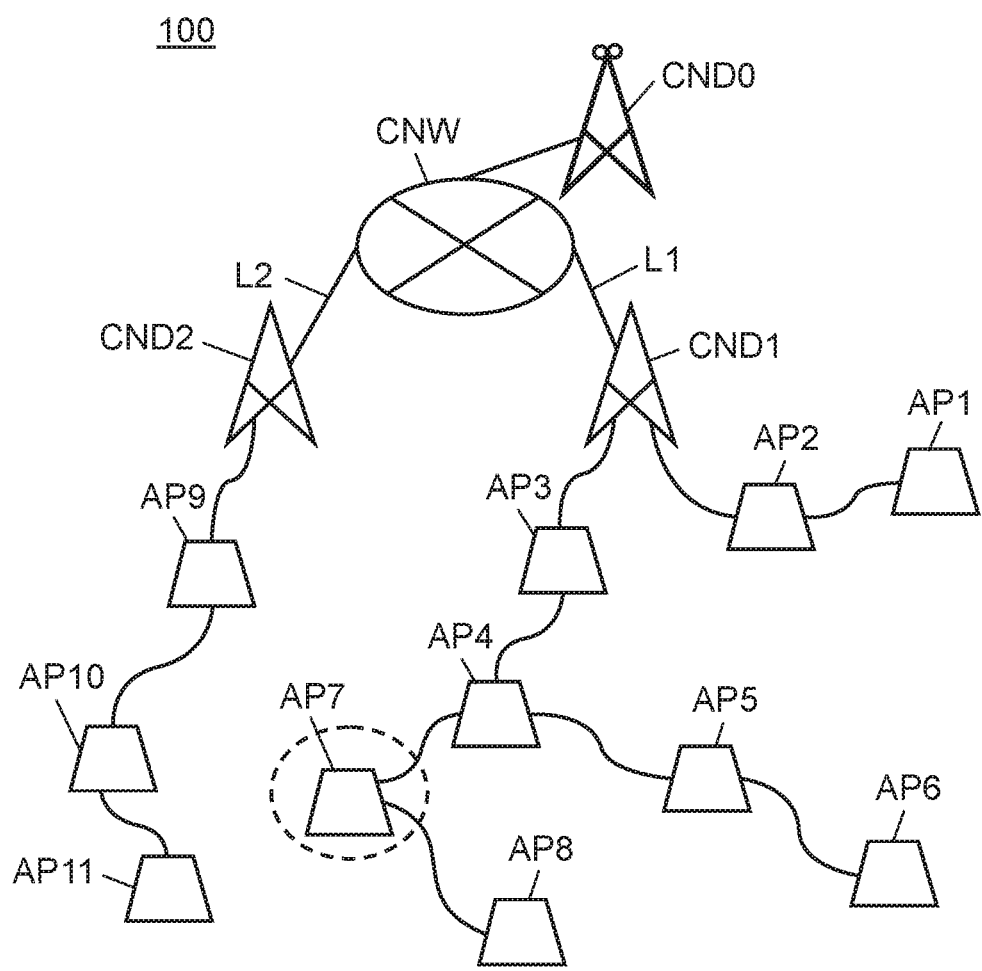
FIG. 5 is a diagram for describing an outline of an operation that is performed when a mobile access point according to the present embodiment withdraws from a wireless multi-hop network.

Specifically, with reference to FIGS. 5 to 9, an example is described where, in a state where wireless multi-hop networks MHNW1 and MHNW2 that are illustrated in FIG. 5 are formed, for example, mobile access point AP7 withdraws from wireless multi-hop network MHNW1 (an example of a first wireless multi-hop network) to which mobile access point AP7 itself currently belongs and is connected, in a single hop, to any one of core nodes CND1 and CND2 on wireless multi-hop networks MHNW1 and MHNW2. More precisely, in the present embodiment, in a case where it is determined that mobile access point AP7 withdraws from wireless multi-hop network MHNW1 to which mobile access point AP7 itself currently belongs, a new communication connection destination of mobile access point AP7 is any one of core nodes CND1 and CND2 that possibly provide a macro-cell for the wireless communication in compliance with the first communication scheme (for example, a single hop (one hop)). Which one of core nodes CND1 and CND2 is suitable as a new communication connection destination depends on a situation that results when the withdrawal of mobile access point AP7 is determined. However, for example, core node CND2 may be determined instead of core node CND1, in a case where core node CND1 on wireless multi-hop network MHNW1 to which mobile access point AP7 itself currently belongs is primarily determined and where core node CND1 is not suitable (for example, in a case where a radio resource is not so sufficiently unoccupied in core node CND1 that the data accommodation is not possible or is difficult).

Figure 9:
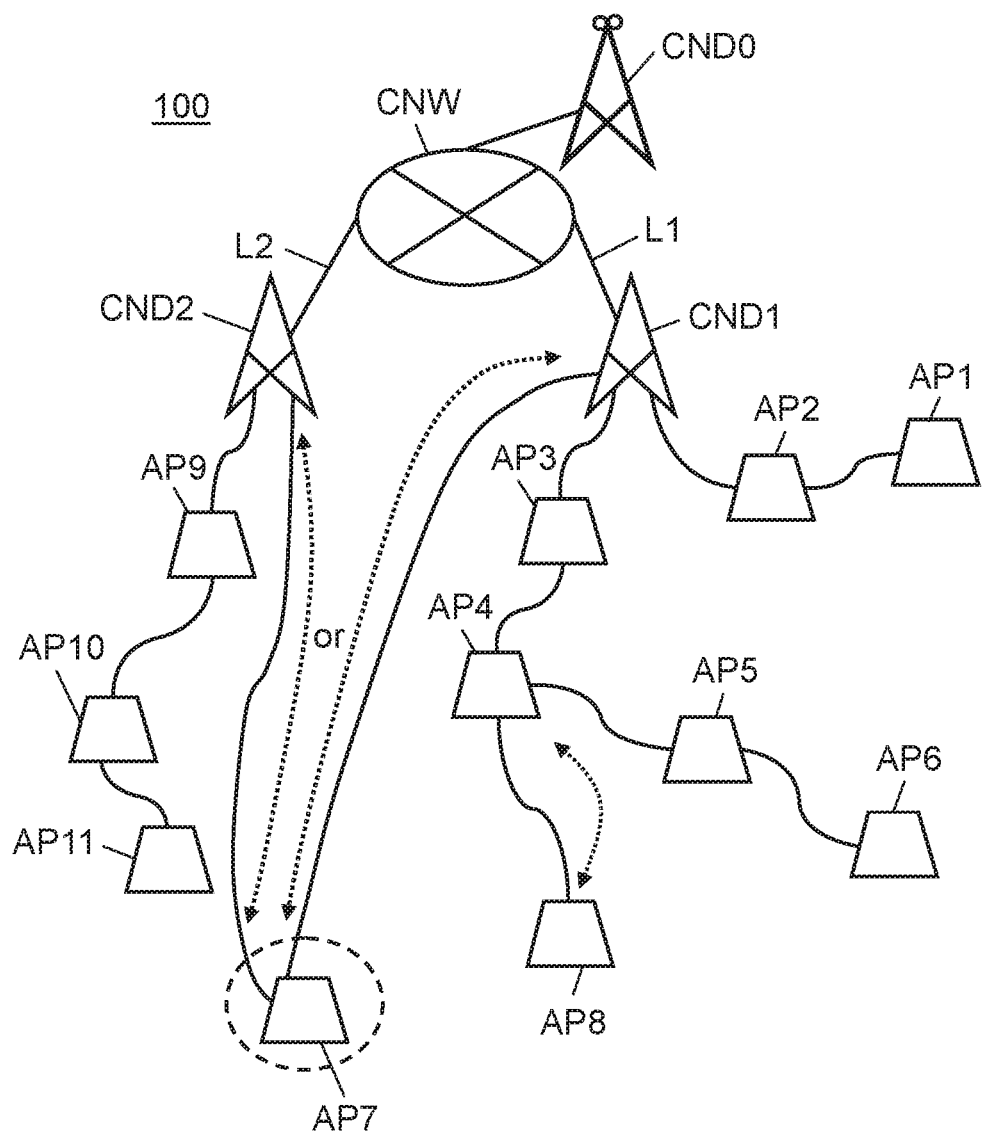
FIG. 9 is a diagram for describing the outline of the operation that is performed when the mobile access point according to the present embodiment withdraws from the wireless multi-hop network.
Figure 10:
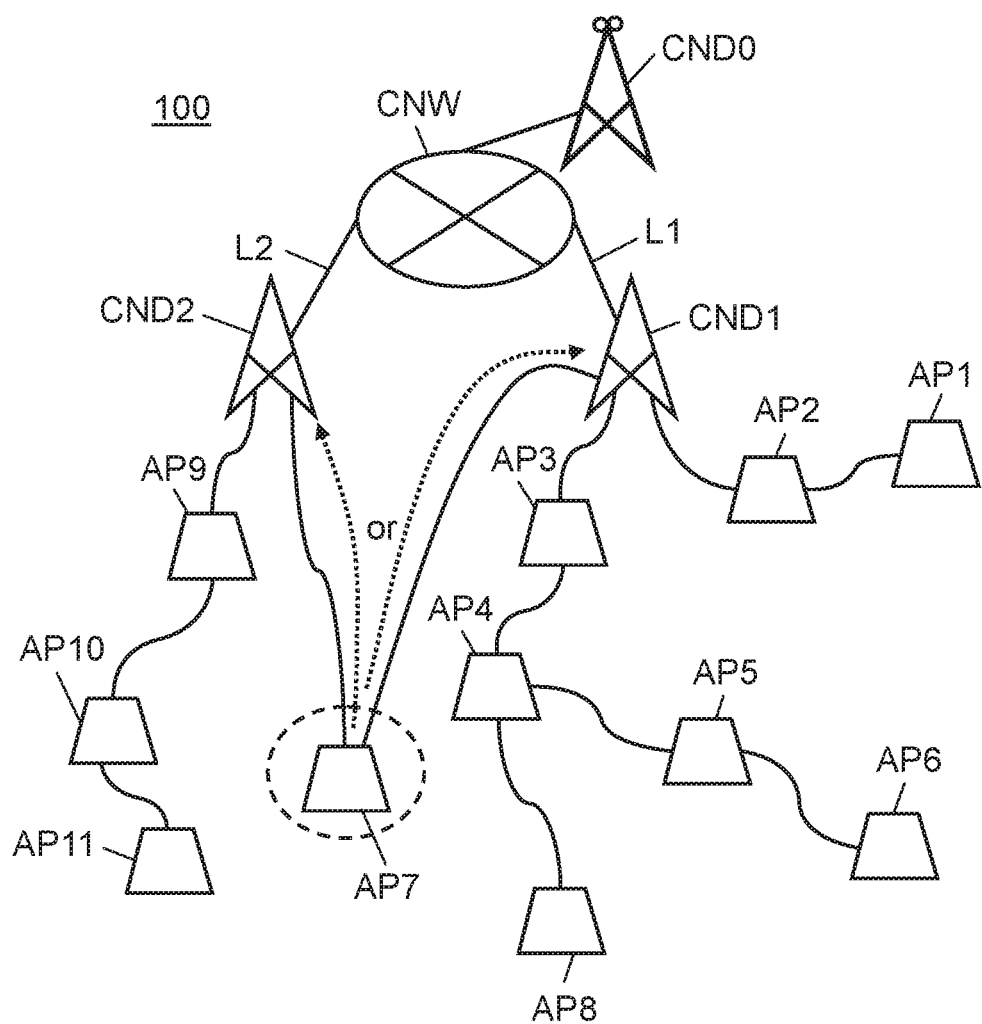
FIG. 10 is a diagram for describing an outline of an operation that is performed when the mobile access point according to the present embodiment participates in the wireless multi-hop network.
Figure 11:
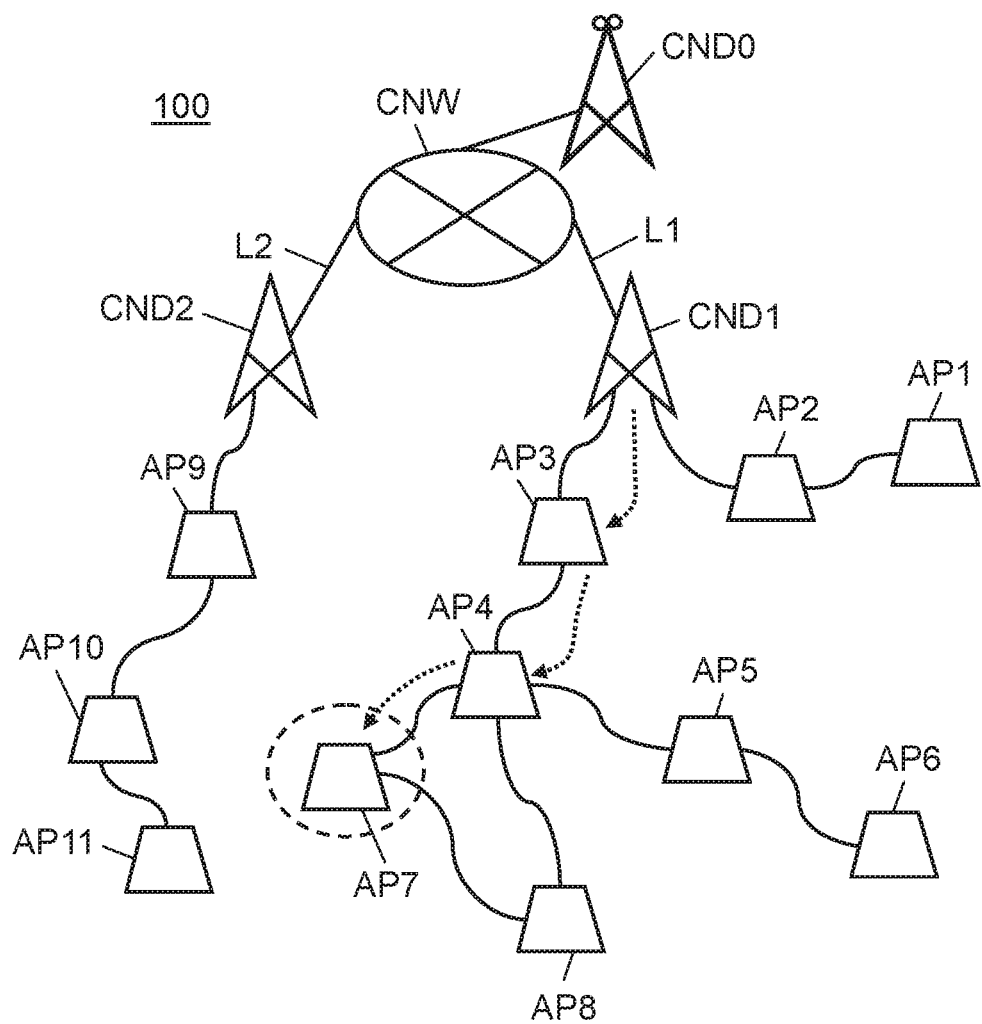
FIG. 11 is a diagram for describing the outline of the operation that is performed when the mobile access point according to the present embodiment participates in the wireless multi-hop network.
Figure 12:
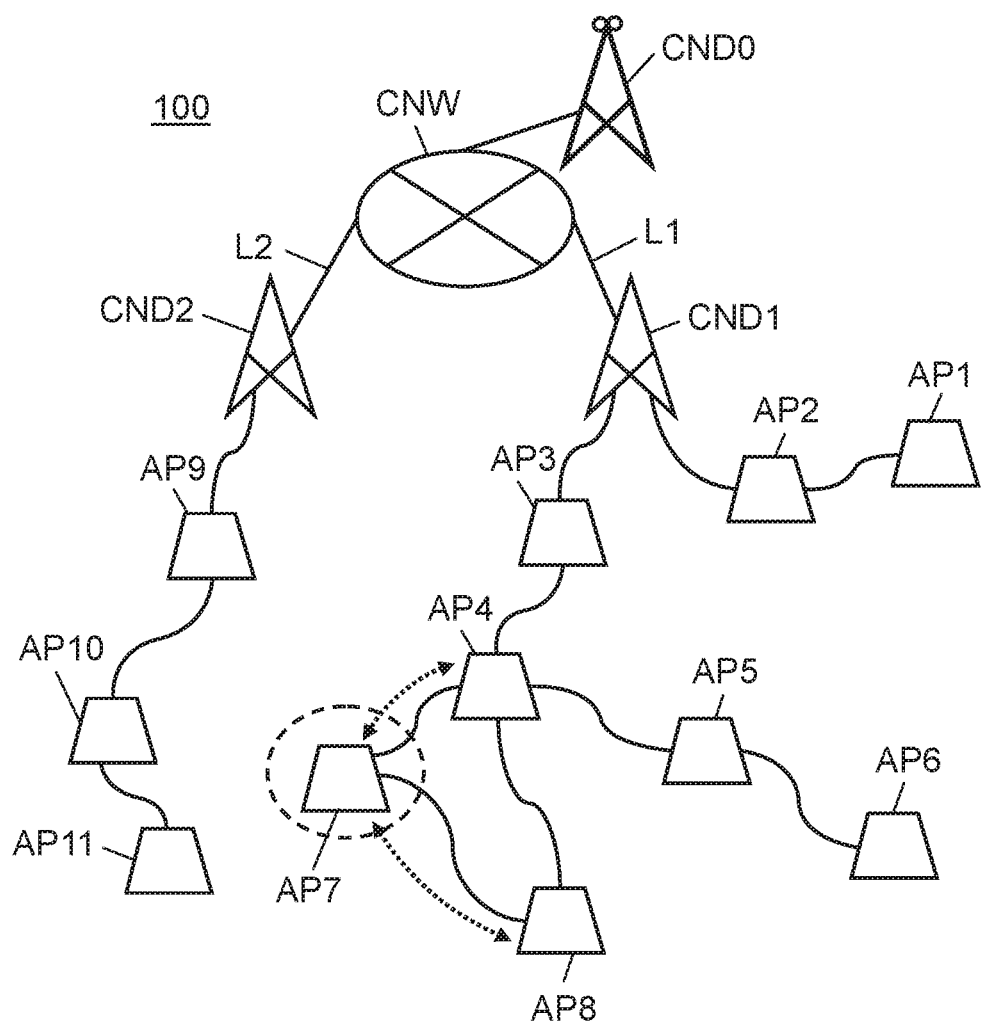
FIG. 12 is a diagram for describing the outline of the operation that is performed when the mobile access point according to the present embodiment participates in the wireless multi-hop network.
Figure 13:
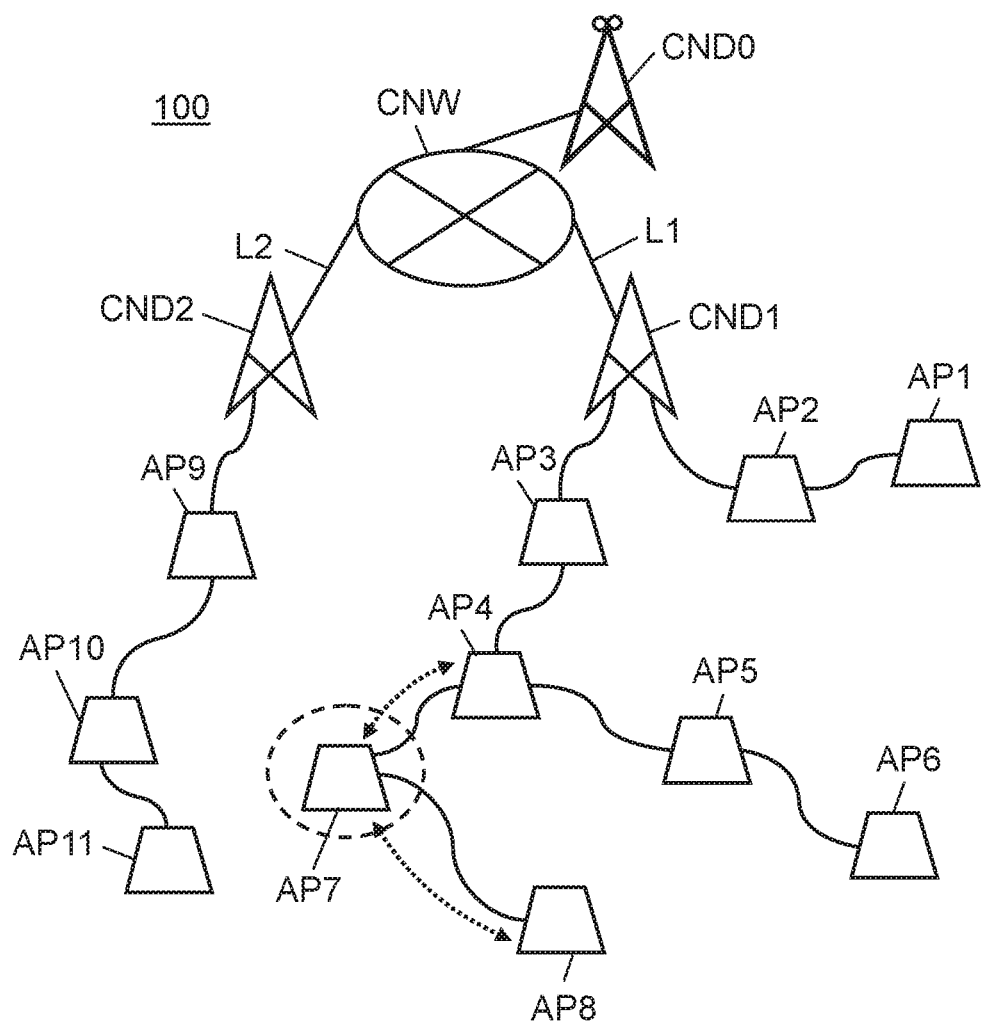
FIG. 13 is a diagram for describing the outline of the operation that is performed when the mobile access point according to the present embodiment participates in the wireless multi-hop network.

Furthermore, with reference to FIGS. 10 to 13, an example is described where, in a case where wireless multi-hop networks MHNW1 and MHNW2 that are illustrated in FIG. 9 are formed, for example, mobile access point AP7 re-participates in pre-withdrawal (more precisely, original) wireless multi-hop network MHNW1 and is connected, in a multi-hop, to the core node CND1 on the wireless multi-hop network MHNW1.

In wireless communication system 100 that is illustrated in FIG. 5, wireless multi-hop network MHNW1 to which mobile access point AP7 currently belongs is managed by core node CND1 or higher-level core node CND0. It is assumed here that, by core node CND1, wireless multi-hop network MHNW1 is managed and established.

For example, based on the received electric field strength (for example, the RSSI) of the measurement signal, core node CND1 determines each mobile access point APk (refer to FIG. 2) that belongs to wireless multi-hop network MHNW1, and establishes the communication path (the MH path) for a wireless multi-hop that is a communication partner of each mobile access point APk (refer to FIG. 2) (S1). Core node CND1 transmits a control signal for allocating a communication scheme for the wireless multi-hop, to each mobile access point APk (specifically, k=1 to 8) that belongs to wireless multi-hop network MHNW1. Information relating to the communication partner is also included in the control signal. Each mobile access point APk (k=1 to 8) receives the control signal, which is originated from core node CND1, directly from core node CND1, or, in the wireless multi-hop, receives the control signal through at least one mobile access point. According to the received control signal, in AP control unit 11 (for example, communication scheme switching unit 115), each mobile access point APk (k=1 to 8) allocates the communication scheme for the wireless multi-hop, as the communication scheme for mobile access point itself, and sets the communication partner in accordance with the control signal. Accordingly, each mobile access point APk (k=1 to 8) that belongs to wireless multi-hop network MHNW1 can perform the wireless multi-hop communication between the mobile access point APk itself and core node CND1 (refer to FIG. 5). Furthermore, the processing in Step S1, which is described above, is the same for core node CND2 on wireless multi-hop network MHNW2 or for mobile access point APk (k=9 to 11), and thus a description thereof is omitted.

As illustrated in FIG. 5, mobile access point AP7 is connected to mobile access point AP8 and mobile access point AP4 as communication partners for the wireless multi-hop communication. In other words, with the wireless multi-hop communication, mobile access point AP7 transfers transfer data from mobile access point AP8 and transfer data from a wireless terminal that is accommodated in mobile access point AP7 itself, to mobile access point AP4 (S2).

In Step S2, without being limited to mobile access point AP7, with the wireless multi-hop communication, each mobile access point APk (k=1 to 11) that is illustrated in FIG. 5 transfers the transfer data from the wireless terminal that is accommodated in mobile access point APk itself, to a mobile access point that is a communication partner of mobile access point APk itself, or a core node, or performs the remotely-controlled movement or processing from remote control apparatus RCP. Alternatively, with the wireless multi-hop communication, each mobile access point APk (k=1 to 11 that are illustrated in FIG. 5 transfers transfer data from the wireless terminal that is accommodated in mobile access point APk itself, and transfer data from any other mobile access point of which a destination is mobile access point APk itself, to a mobile access point or a core node that is a communication partner of mobile access point APk itself, or performs the remotely-controlled movement or processing from remote control apparatus RCP.

It is determined whether or not mobile access point APk (k=1 to 8) that withdraws from wireless multi-hop network MHNW1 is present (S3). These determination cases, as described above, for example, include the case where mobile access point AP7 makes a determination and the case where the core node CND1 on wireless multi-hop network MHNW1 makes a determination. The former case is a case where, for example, mobile access point AP7 itself determines that the transfer delay time in the wireless multi-hop communication is not sufficient and that the allowable delay time at the time of communication cannot be satisfied. The latter case is a case where, for example, mobile access point AP7 is positioned so far from the area covered by wireless multi-hop network MHNW1 that mobile access point AP7 itself is not on the communication path along wireless multi-hop network MHNW1 to which mobile access point AP7 itself currently belongs, or a case where mobile access point AP7 is going to move farther away from the area. In a case where mobile access point that withdraws from wireless multi-hop network MHNW1 is not present (NO in S3), the operation of wireless communication system 100 proceeds to Step S9.

Figure 6:
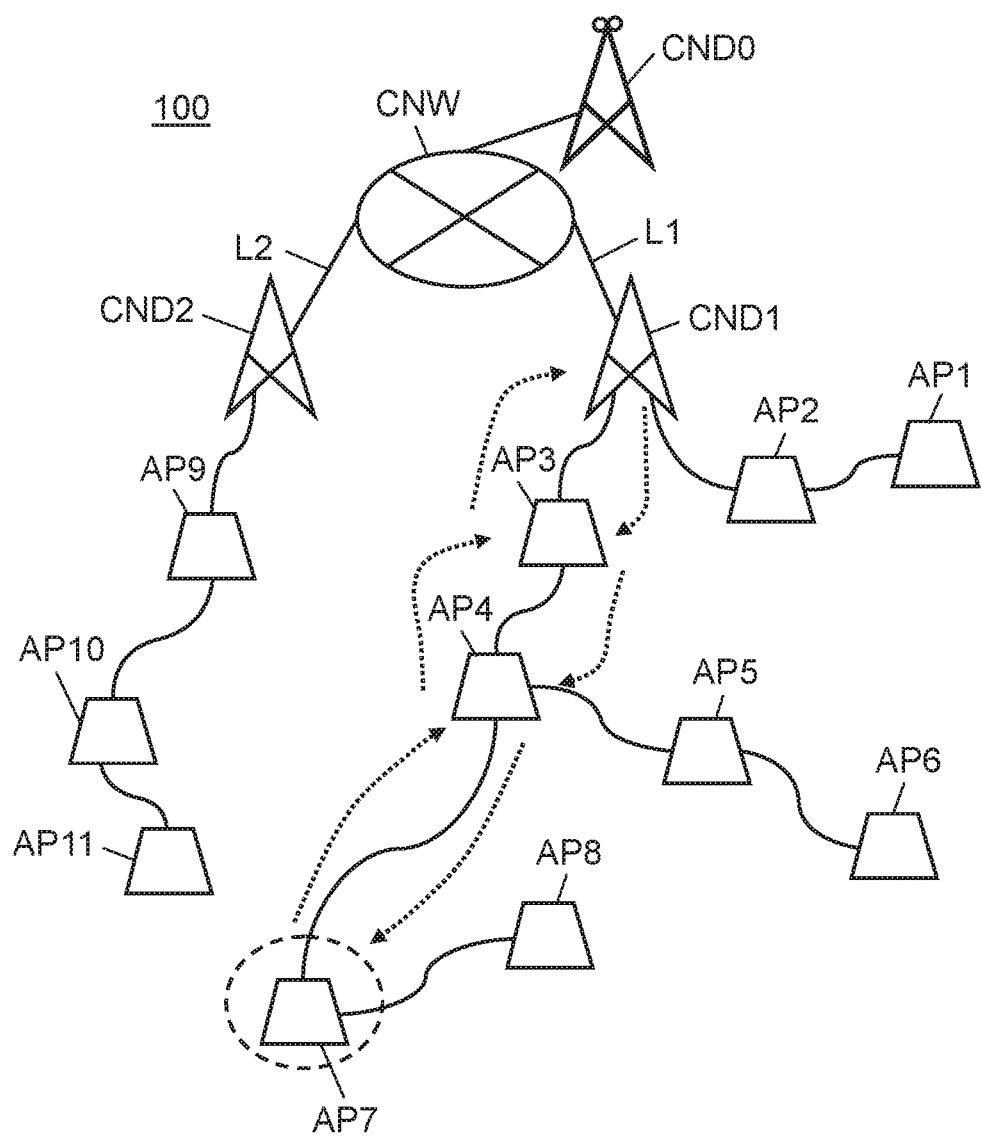
FIG. 6 is a diagram for describing the outline of the operation that is performed when the mobile access point according to the present embodiment withdraws from the wireless multi-hop network.

In the former case (YES in S3), for reporting to core node CND1, mobile access point AP7 transmits a message to the effect that mobile access point AP7 itself withdraws from wireless multi-hop network MHNW1 and information on mobile access point AP7 itself that is a withdrawal target, to core node CND1, through mobile access points AP4 and AP3, using the wireless multi-hop communication (S4) (refer to FIG. 6). Core node CND1 generates a control signal for allocating the wireless communication in compliance with the first communication scheme (for example, a single hop (one hop)) to mobile access point AP7 that is a transmission source of the message to the effect that the mobile access point AP7 withdraws. Included in this control signal is information on a communication partner (for example, any one of core nodes CND1 and CND2) for the first communication scheme (for example, a single hop (one hop)). Core node CND1 transmits the generated control signal to mobile access point AP7 through mobile access points AP3 and AP4, using the wireless multi-hop communication (refer to FIG. 6). When receiving the control signal from core node CND1, according to the control signal, mobile access point AP7 allocates the wireless communication in compliance with the first communication scheme (for example, a single hop (one hop)) in AP control unit 11 (for example, communication scheme switching unit 115) (S4). Accordingly, for example, if a communication connection relating to the wireless communication in compliance with the first communication scheme is completed between mobile access point AP7 itself and any one of core nodes CND1 and CND2 on wireless multi-hop networks MHNW1 and MHNW2, mobile access point AP7 can perform the wireless communication in compliance with the first communication scheme (for example, a single hop (one hop)) (refer to FIG. 7).

On the other hand, in the latter case (YES in S3), core node CND1 generates the control signal for allocating the wireless communication in compliance with the first communication scheme (for example, a single hop (one hop)) to mobile access point AP7 that is determined as withdrawing from wireless multi-hop network MHNW1. Included in this control signal is information on a communication partner (for example, any one of core nodes CND1 and CND2) for the first communication scheme (for example, a single hop (one hop)). Core node CND1 transmits the generated control signal to mobile access point AP7 through mobile access points AP3 and AP4, using the wireless multi-hop communication (refer to FIG. 6). When receiving the control signal from core node CND1, according to the control signal, mobile access point AP7 allocates the wireless communication in compliance with the first communication scheme (for example, a single hop (one hop)) in AP control unit 11 (for example, communication scheme switching unit 115) (S4). Accordingly, if a communication connection relating to the wireless communication in compliance with the first communication scheme is completed between mobile access point AP7 itself and any one of core nodes CND1 and CND2 on wireless multi-hop networks MHNW1 and MHNW2, mobile access point AP7 can perform the wireless communication in compliance with the first communication scheme (for example, a single hop (one hop)) (refer to FIG. 7).

Furthermore, in any one of the former and the latter case, which are described above, core node CND1 also allocates the wireless communication in compliance with the first communication scheme (for example, a single hop (one hop)). Accordingly, core node CND1 can perform the wireless communication in compliance with the first communication scheme (for example, a single hop (one hop)) between core node CND1 itself and mobile access point AP7 (refer to FIG. 7). Alternatively, core node CND1 transmits the control signal for allocating the wireless communication in compliance with the first communication scheme (for example, a single hop (one hop)) to core node CND2 that is a new communication partner (a communication connection destination) of mobile access point AP7. In a case where the new communication partner (the communication connection destination) of mobile access point AP7 is core node CND2, according to the control signal from the core node CND1, core node CND2 allocates the wireless communication in compliance with the first communication scheme (for example, a single hop (one hop)) between core node CND2 itself and mobile access point AP7. Accordingly, core node CND2 can perform the wireless communication in compliance with the first communication scheme (for example, a single hop (one hop)) between core node CND1 itself and mobile access point AP7 (refer to FIG. 7).

With the wireless communication in compliance with the first communication scheme (for example, a single hop (one hop)), mobile access point AP7 transfers transfer data from the wireless terminal that is accommodated in mobile access point AP7 itself, to core node CND2 (S5). In Step S5, with the wireless communication in compliance with the first communication scheme (for example, a single hop (one hop)), mobile access point AP7 may transfer the transfer data from the wireless terminal that is accommodated in mobile access point AP7 itself, to any one of core nodes CND1 and CND2, or may perform the remotely-controlled movement and processing from remote control apparatus RCP.

Subsequently to Step S5, mobile access point AP7 receives an inquiry as to whether or not to re-participate in pre-withdrawal (more precisely, original) wireless multi-hop network MHNW1 (S6). These determination cases, in the same manner as in Step S3, for example, include the case where mobile access point AP7 makes a determination and the case where the core node CND1 on wireless multi-hop network MHNW1 makes a determination. The former case is a case where, for example, mobile access point AP7 itself determines that the transfer delay time in the wireless multi-hop communication can satisfy the allowable delay time at the time of communication cannot be satisfied. The latter case is a case where, for example, mobile access point AP7 returns into the area covered by wireless multi-hop network MHNW1 (more precisely, the original wireless multi-hop network MHNW1) to which mobile access point AP7 itself belonged before the withdrawal or is a case where mobile access point AP7 approaches the area. In a case where mobile access point AP7 does not re-participate in wireless multi-hop network MHNW1 (in other words, in a case where there is a need for mobile access point AP7 to continue the wireless communication in compliance with the first communication scheme (a single hop (one hop)) between the mobile access point AP7 itself and any one of core nodes CND1 and CND2) (NO in S6), the processing in Step S5 in mobile access point AP7 is repeated until a situation suitable the re-participation by mobile access point AP7 in wireless multi-hop network MHNW1 is reached. Mobile access point AP7 repeatedly transmits the environmental information on mobile access point AP7 itself, to any one of core nodes CND1 and CND2 that are in the wireless communication in compliance with the first communication scheme. Particularly, while mobile access point AP7 is in the wireless communication in compliance with the first communication scheme between mobile access point AP7 itself and core node CND2, based on the environmental information on mobile access point AP7, core node CND2 may determine whether or not mobile access point AP7 re-participates in pre-withdrawal (more precisely, original) wireless multi-hop network MHNW1.

In the former case (YES in S6), mobile access point AP7 interrupts the wireless communication in compliance with the first communication scheme between mobile access point AP7 and any one of core nodes CND1 and CND2, and transmits a message to the effect that mobile access point AP7 itself re-participates in wireless multi-hop network MHNW1 and the information on mobile access point AP7 itself to any of core nodes CND1 and CND2 that is in the wireless communication in compliance with the first communication scheme, using the wireless communication in compliance with the first communication scheme (for example, a single hop (one hop)) (S7) (refer to FIG. 14). In a case where a partner of mobile access point AP7 for the wireless communication in compliance with the first communication scheme is core node CND2, core node CND2 transmits (transfers) the message and the information on mobile access point AP7, which are transmitted from mobile access point AP7, to core node CND1. In the latter case (YES in S6), core node CND1 retains the information to the effect that mobile access point AP7 is caused to participate in wireless multi-hop network MHNW1 and the information on mobile access point AP7. Because of this, the processing (more precisely, the transfer of the message and the information on mobile access point AP7, which are described above) by each of mobile access point AP7 and core node CND2 in the former case (YES in S6) described above is omitted. Furthermore, due to the participation (the re-participation) by mobile access point AP7 in wireless multi-hop network MHNW1, any one of core nodes CND1 and CND2 that are in the wireless communication in compliance with the first communication scheme between each of core nodes CND1 and CND2 and mobile access point AP7 establishes the communication path (the MH path) in such a manner that the connection to mobile access point AP7 is released (refer to FIGS. 11 to 13).

Based on the received electric field strength (for example, the RSSI) of the measurement signal, which is measured by core node CND1, core node CND1 re-establishes the communication path (the MH path) for the wireless multi-hop that is a communication partner of each mobile access point APk (refer to FIG. 2) that belongs to wireless multi-hop network MHNW1 (S8). Subsequently to Step S8, the processing by wireless communication system 100 proceeds to Step S2.

Core node CND1 generates a control signal for allocating the wireless multi-hop communication to mobile access point AP7 that is determined as re-participating in wireless multi-hop network MHNW1. Included in this control signal are pieces of information on communication partners (for example, mobile access points AP4 and AP8) for the wireless multi-hop communication. Core node CND1 transmits the generated control signal to mobile access point AP7 through mobile access points AP3 and AP4 (refer to FIG. 11). When a control signal that is generated by core node CND1, according to this control signal, mobile access point AP7 not only allocates the wireless multi-hop communication in AP control unit 11 (for example, communication scheme switching unit 115), but also set a communication partner in accordance with the control signal. Accordingly, mobile access point AP7 can perform the wireless multi-hop communication with mobile access points AP 4 and AP8 on wireless multi-hop network MHNW1 (refer to FIG. 12). Due to the participation (the re-participation) by mobile access point AP7 in wireless multi-hop network MHNW1, core node CND1 establishes the communication path (the MH path) in such a manner that a connection between mobile access point AP4 and mobile access point AP8 is released (refer to FIG. 13).

The processing in Step S8 is not limited to being performed subsequently to Step S7 or subsequently to Step S10 that will be described below, and, for example, may be performed subsequently to Step S4. In a case where, for example, the processing in Step S8 is performed subsequently to Step S4, due to the withdrawal of mobile access point AP7 from wireless multi-hop network MHNW1, core node CND1 establishes the communication path (the MH path) in such a manner that direction communication between mobile access point AP4 and mobile access point AP8 are possible (refer to FIG. 8). Moreover, due to the withdrawal of mobile access point AP7 from wireless multi-hop network MHNW1, core node CND1 establishes the communication path (the MH path) in such a manner that a connection between mobile access point AP4, mobile access point AP7, and mobile access point AP8 (refer to FIG. 9).

Subsequently to Step S4, in a case where, without being limited to mobile access point AP7, any one of mobile access points AP1 to AP6 and AP8 withdraws from wireless multi-hop network MHNW1, core node CND1 determines whether or not the withdrawing mobile access point re-participates in pre-withdrawal (more precisely, original) wireless multi-hop network MHNW1 wireless multi-hop network MHNW1 (S9). The details of a determination method in Step S9 and of processing in Step S10 in a case where any other mobile access point that re-participates is present (YES in S9) are the same as those of determination method in Step S6 and of the processing in Step S7, and thus detailed descriptions thereof are omitted. In Step S9, in a case where the re-participating mobile access point is not present (NO in S9), processing in step s10 is omitted. Subsequently to Step S10, processing (more precisely, the establishing of the communication path (the MH path) for each mobile access point that belongs to wireless multi-hop network MHNW1 in core node CND1) in Step S8 is performed.

As described above, wireless communication system 100 according to the present embodiment, multiple mobile access points, mobile access points AP1 to AP11 and multiple core nodes, core nodes CND1 and CND2, which relay pieces of data that are transmitted from different wireless terminals, make up multiple different wireless multi-hop networks (MHNW1 and MHNW2) and are communicatively connected. Due to the result of the determination that mobile access point APk has to withdraw from wireless multi-hop network MHNW1 to which mobile access point APk itself belong, mobile access point APk (for example, mobile access point AP7) transmits, in the wireless multi-hop, a request for a connection that uses the wireless communication in compliance with the first communication scheme (for example, a single hop (one hop)) between mobile access point APk itself and any one of core nodes CND1 and CND2 on wireless multi-hop network MHNW1 and MHNW2, to core node CND1 on wireless multi-hop network MHNW1. According to the request for the connection, core node CND1 on wireless multi-hop network MHNW1 controls the performing of the allocation of the wireless communication in compliance with the first communication scheme (for example, a single hop (one hop)) between any one of core nodes CND1 and CND2 and mobile access point AP7. Specifically, core node CND1 allocates the wireless communication in compliance with the first communication scheme (for example, a single hop (one hop)) between core node CND1 itself and mobile access point AP7, and transmits the control signal for allocating the wireless communication in compliance with the first communication scheme (for example, a single hop (one hop)) between mobile access point AP7 itself and core node CND1, to core node CND1. According to the control signal from core node CND1, mobile access point AP7 allocates the wireless communication in compliance with the first communication scheme (a single hop (one hop)) between mobile access point AP7 itself and core node CND1. Alternatively, in a case where a new communication connection destination of mobile access point AP7 that uses the first communication scheme (for example, a single hop (one hop)) is core node CND2, core node CND1 transmits a control signal for allocating the wireless communication in compliance with the first communication scheme (a single hop (one hop)) between core node CND1 itself and core node CND2 on wireless multi-hop network MHNW2, to mobile access point AP7. Moreover, core node CND1 transmits a control signal for allocating the wireless communication in compliance with the first communication scheme (for example, a single hop (one hop)) between core node CND1 itself and mobile access point AP7, to core node CND2. According to the control signal from core node CND1, core node CND2 allocates the wireless communication in compliance with the first communication scheme (for example, a single hop (one hop)) between core node CND2 and mobile access point AP7.

Accordingly, according to an operating environment (for example, the environment information on mobile access point AP7) at the time of communication, in which the communication path (the MH path) for the wireless multi-hop communication, wireless communication system 100 can suitably switch between wireless multi-hop communication withdrawal and withdrawal in wireless multi-hop network MHNW1 to which mobile access point AP7 currently belongs. Furthermore, wireless communication system 100 can allocate a communication scheme that can conform to purposes at the time of the communication that requires a low delay time, for example, such as a purpose of meeting the need to transfer camera image data in real time, to mobile access point AP7 that is determined as having to withdraw from wireless multi-hop network MHNW1. More precisely, mobile access point AP7 in operation is excluded from wireless multi-hop network MHNW1 and thus communication is made possible in one hop between mobile access point AP7 and any one of core nodes CND1 and CND2. As a result, for example, although mobile access point AP7 moves to a place that is a long distance from the area covered by wireless multi-hop network MHNW1, an increase in the transfer delay time of data in mobile access point AP7 can be avoided. Furthermore, in a case where mobile access point AP7 withdraws from wireless multi-hop network MHNW1, in wireless communication system 100, with the wireless communication in compliance with the first communication scheme (for example, a single hop (one hop)) between mobile access point AP7 and any one of core nodes CND1 and CND2, mobile access point AP7 is connectable to core network CNW. Because of this, the data communication with core network CNW can be continued without any interruption. The case where mobile access point AP7 withdraws from wireless multi-hop network MHNW1 is not limited to the case where mobile access point AP7 itself performs the wireless communication in which the low latency is required, and, for example, is equivalent to a case where mobile access point AP7 is positioned so far from the area covered by wireless multi-hop network MHNW1 that mobile access point AP7 cannot be included in the area. Moreover, in wireless communication system 100, mobile access point AP7 that frequently moves over a fairly great distance (for example, at a high moving speed or in a broad moving range) can be prevented to a large extent from using the wireless multi-hop. Because of this, the unnecessary use of a radio resource can be avoided when mobile access point AP7 needs a large amount of transfer as is the case with the transfer of camera image data, and a deterioration in the use efficiency of the radio resource can be suppressed. Furthermore, in wireless communication system 100, in a case where the area covered by each of wireless multi-hop networks MHNW1 and MHNW2 is set to be area (for example, a disaster scene, a university campus, a site owned by a corporate organization, such as a company, a large-sized parking lot), to which a moving range of mobile access point APk (refer to FIG. 2) is limited, for example, communication fees can be reduced by using the wireless communication (for example, the wireless LAN such as Wi-Fi® that does not depend on a business operator of a cellular system, and the convenience of setting up a system of which the use can contribute to a short-term operation (for example, in the case of a festival or an event for one day) can be improved.

Furthermore, due to the result of the determination that mobile access point AP7 has to participate in wireless multi-hop network MHNW1, mobile access point AP7 transmits the request for the connection that uses the wireless multi-hop between mobile access point AP7 and core node CND1 on wireless multi-hop network MHNW1, to any one of core nodes CND1 and CND2 that are in the wireless communication in compliance with the first communication scheme (for example, a single hop (one hop)). In a case where the request for the connection is received from mobile access point AP7, core node CND2 transmits the request for the connection to core node CND1. According to the request for the connection, core node CND1 on wireless multi-hop network MHNW1 controls formation of wireless multi-hop network MHNW1, with mobile access point AP7 being caused to participate in wireless multi-hop network MHNW1 (more precisely, forms wireless multi-hop network MHNW1 that includes mobile access point AP7). Accordingly, for example, when the area covered by wireless multi-hop network MHNW1 is approached, or when there is no need to perform the communication in which the low latency is not required, mobile access point AP7 can re-participate in pre-withdrawal (more precisely, original) wireless multi-hop network MHNW1. Because of this, a contribution to the expandability of the area covered by wireless multi-hop network MHNW1 can be made.

Furthermore, mobile access point AP7 further includes at least one camera FRC1, and, for example, according to whether or not a timing for transmitting data of an image that is captured by camera FRC1 comes, determines whether or not mobile access point AP7 itself withdraws from wireless multi-hop network MHNW1. Accordingly, when there is a need to perform the communication in which the low latency is required (for example, a need to transmit the camera image data when the movement or processing that is remotely controlled by remote control apparatus RCP is performed), mobile access point AP7 withdraws from wireless multi-hop network MHNW1, and make a direct connection to any one of core nodes CND1 and CND2 that possibly perform the one-hop communication. Because of this, the movement or process that meets the need of the remote operator can be performed, and the ease of use of mobile access point AP7 can be improved.

Furthermore, mobile access point AP7 acquires the environmental information (for example, the positional information) on mobile access point AP7, and repeatedly transmits, in the wireless multi-hop, the environmental information to core node CND1 on wireless multi-hop network MHNW1. In a case where, based on the environment information on mobile access point AP7, it is determined that mobile access point AP7 has to withdraw from wireless multi-hop network MHNW1, core node CND1 on wireless multi-hop network MHNW1 controls the performing of the allocation of the wireless communication in compliance with the first communication scheme (for example, a single hop (one hop)) between any one of core nodes CND1 and CND2 and mobile access point AP7. Specifically, core node CND1 allocates the wireless communication in compliance with the first communication scheme (for example, a single hop (one hop)) between core node CND1 itself and mobile access point AP7, and transmits the control signal for allocating the wireless communication in compliance with the first communication scheme (for example, a single hop (one hop)) between mobile access point AP7 itself and core node CND1, to core node CND1. According to the control signal from core node CND1, mobile access point AP7 allocates the wireless communication in compliance with the first communication scheme (a single hop (one hop)) between mobile access point AP7 itself and core node CND1. Alternatively, in the case where a new communication connection destination of mobile access point AP7 that uses the first communication scheme (for example, a single hop (one hop)) is core node CND2, core node CND1 transmits a control signal for allocating the wireless communication in compliance with the first communication scheme (a single hop (one hop)) between core node CND1 itself and core node CND2 on wireless multi-hop network MHNW2, to mobile access point AP7. Moreover, core node CND1 transmits the control signal for allocating the wireless communication in compliance with the first communication scheme (for example, a single hop (one hop)) between core node CND1 itself and mobile access point AP7, to core node CND2. According to the control signal from core node CND1, core node CND2 allocates the wireless communication in compliance with the first communication scheme (for example, a single hop (one hop)) between core node CND2 and mobile access point AP7. Accordingly, in a case where mobile access point AP7 cannot determine on its own that mobile access point AP7 has to withdraw from wireless multi-hop network MHNW1, core node CND1 can also switch between the wireless multi-hop communication withdrawal and non-withdrawal in wireless multi-hop network MHNW1 to which mobile access point AP7 currently belongs.

Furthermore, mobile access point AP7 repeatedly transmits the environmental information on mobile access point AP7 itself to any one of core nodes CND1 and CND2 that are in the wireless communication in compliance with the first communication scheme (for example, a single hop (one hop)). In a case where, based on the environmental information on mobile access point AP7, it is determined that mobile access point AP7 has to be caused to participate in wireless multi-hop network MHNW1, any one of core nodes CND1 and CND2 that are in the wireless communication that are the wireless communication in compliance with the first communication scheme (for example, a single hop (one hop)) controls the formation of wireless multi-hop network MHNW1, with mobile access point AP7 being caused to participate in wireless multi-hop network MHNW1 (forms more precisely, wireless multi-hop network MHNW1 that includes mobile access point AP7). Accordingly, in a case where mobile access point AP7 cannot determine on its own that mobile access point AP7 itself has to re-participate in wireless multi-hop network MHNW1, core node CND1 can also cause mobile access point AP7 to participate in pre-withdrawal (more precisely, original) wireless multi-hop network MHNW1. Because of this, a contribution to the expandability of the area covered by wireless multi-hop network MHNW1 can be made.

The various embodiments are described above with reference to the drawings, but it goes without saying that the present invention is not limited to such examples. It is apparent to a person of ordinary skill that various modification examples or revision examples can be contemplated within the scope of a claim, and, of course, it is understood that these also justifiably fall within the technical scope of the present invention. Furthermore, the constituent elements in the embodiments, which are described above, may be voluntarily combined within the scope that does not depart from the gist of the invention.

In the present embodiment, even in a case where it is determined that mobile access point AP7 itself has to participate (re-participate) in wireless multi-hop network MHNW1, mobile access point AP7 that withdrawn one time from wireless multi-hop network MHNW1, the use of the communication scheme that is currently in use may be maintained as it. More precisely, mobile access point AP7 may continue the wireless communication with any one of core nodes CND1 and CND2 that are in the wireless communication in compliance with the first communication scheme (for example, a single hop (one hop)).

INDUSTRIAL APPLICABILITY

The present disclosure is useful in implementing a wireless relay device, a program, a wireless communication system, and a wireless communication method, which suitably switch between wireless multi-hop withdrawal and non-withdrawal according to an operating environment at the time of communication, in which a path for wireless multi-hop is established, conforms to purposes at the time of the communication that requires a low delay time, continues data communication with a core network that is connected to a wireless multi-hop network, even if wireless multi-hop communication withdrawal takes place, and suppresses a deterioration in the use efficiency of a radio resource.

REFERENCE MARKS IN THE DRAWINGS

11 AP CONTROL UNIT
13, 23 MEMORY
15, 25 STORAGE
17, 27 COMMUNICATION UNIT
21 ND CONTROL UNIT
100 WIRELESS COMMUNICATION SYSTEM
111 AP ENVIRONMENTAL-INFORMATION ACQUISITION UNIT
112 SIGNAL MULTIPLEXING AND DEMULTIPLEXING UNIT
113 MHNW WITHDRAWAL AND PARTICIPATION DETERMINATION UNIT
114 COMMUNICATION SCHEME DETERMINATION UNIT
115, 215 COMMUNICATION SCHEME SWITCHING UNIT
171, 271 WLAN SINGLE HOP COMMUNICATION MODULE
173, 273 WLAN MULTI-HOP COMMUNICATION MODULE
211 MH PATH ESTABLISHMENT UNIT
213 COMMUNICATION CONTROL UNIT
275 CORE NETWORK COMMUNICATION MODULE
AC1, ACm ACTUATOR
ANT1, ANT2 ANTENNA
AP1, AP2, AP3, AP4, AP5, AP6, AP7, APB, AP9, AP10, AP11, APk MOBILE ACCESS POINT (WIRELESS RELAY DEVICE)
CND0, CND1, CND2 CORE NODE (WIRELESS BASE STATION)
CNW CORE NETWORK
FRC1, FRC2 CAMERA
GK PORTABLE TELEPHONE
GP GPS RECEIVER
MHNW, MHNW1, MHNW2 WIRELESS MULTI-HOP NETWORK
RCP REMOTE CONTROL APPARATUS
S1, Sn SENSOR
SM SMARTPHONE
TB TABLET TERMINAL
VL SPEED DETECTOR

The invention claimed is:

1. A wireless communication system including a first wireless multi-hop network, which comprises:
multiple wireless relay devices that relay data, which are transmitted from one or more wireless terminals, using a wireless multi-hop communication, and
a first core node wireless base station configured to communicate with each of the multiple wireless relay devices, using a wireless single-hop communication or the wireless multi-hop communication, and configured to connect to a core network using a wired line,
wherein the wireless relay devices include a mobile wireless relay device which, in operation:
determines whether or not to withdraw from the first wireless multi-hop network, and
responsive to a determination to withdraw from the first wireless multi-hop network, transmits to the first core node wireless base station, using the wireless multi-hop communication, a request to connect, using the wireless single-hop communication, to a second core node wireless base station of a second wireless multi-hop network,
wherein the first core node wireless base station, responsive to the request, transmits control signaling to the second core node wireless base station, and
wherein the second core node wireless base station, responsive to the control signaling, supports the wireless single-hop communication with the mobile relay device.

2. The wireless communication system of claim 1, wherein the mobile wireless relay device, after having withdrawn from the first wireless multi-hop network, determines whether or not to re-participate in the first wireless multi-hop network, and
responsive to a determination to re-participate in the first wireless multi-hop network, transmits to the second core node wireless base station, using the wireless single-hop communication, a re-participation request to connect, using the wireless multi-hop communication, to the first core node wireless base station of the first wireless multi-hop network,
wherein the second node wireless base station, responsive to the re-participation request, transmits re-participation control signaling to the first core node wireless base station, and
wherein the first core node wireless base station, responsive to the re-participation control signaling, supports the wireless multi-hop communication with the mobile relay device.

3. The wireless communication system of claim 2,
wherein the determination to re-participate in the first wireless multi-hop network is based on environmental information of the mobile wireless relay device.

4. The wireless communication system of claim 3, wherein the determination to re-participate in the first wireless multi-hop network is made by the mobile wireless relay device or by the first core node wireless base station or by both the mobile wireless relay device and the first core node wireless base station.

5. The wireless communication system of claim 1,
wherein the mobile wireless relay device includes at least one camera, and the determination to withdraw from the first wireless multi-hop network is based on a timing for transmitting an image that is captured by the at least one camera.

6. The wireless communication system of claim 1,
wherein the mobile wireless relay device is configured to acquire environmental information of the mobile wireless relay device, and to repeatedly transmit, using the wireless multi-hop communication, the environmental information to the first core node wireless base station, and wherein the determination to withdraw from the first wireless multi-hop network is based on the environmental information.

7. The wireless communication system of claim 1, wherein, after the mobile wireless relay devices withdraws from the first wireless multi-hop network, the first core node wireless base station re-configures the first wireless multi-hop network.

8. The wireless communication system of claim 1, wherein the determination to withdraw from the first wireless multi-hop network is based on a determination that a delay time of the wireless multi-hop communication cannot meet an allowable latency requirement.

9. The wireless communication system of claim 1, wherein the determination to withdraw from the first wireless multi-hop network is made by the mobile wireless relay device or by the first core node wireless base station or by both the mobile wireless relay device and the first core node wireless base station.

10. A wireless communication method in a wireless communication system including a first wireless multi-hop network, which includes multiple wireless relay devices that relay data, which are transmitted from one or more wireless terminals, using a wireless multi-hop communication, and a first core node wireless base station configured to communicate with each of the multiple wireless relay devices, using a wireless single-hop communication or the wireless multi-hop communication, and configured to connect to a core network using a wired line, wherein the wireless relay devices include a mobile wireless relay device, the method comprising:
determining whether or not the mobile wireless relay device is to withdraw from the first wireless multi-hop network,
responsive to a determination that the mobile wireless relay device is to withdraw from the first wireless multi-hop network, the mobile wireless relay device transmitting to the first core node wireless base station, using the wireless multi-hop communication, a request to connect, using the wireless single-hop communication, to a second core node wireless base station of a second wireless multi-hop network,
the first core node wireless base station, responsive to the request, transmitting control signaling to the second core node wireless base station, and
the second core node wireless base station, responsive to the control signaling, supporting the wireless single-hop communication with the mobile relay device.

11. The wireless communication method of claim 10, comprising:
after the mobile wireless relay device withdraws from the first wireless multi-hop network,
determining whether or not the mobile wireless relay device is to re-participate in the first wireless multi-hop network,
responsive to a determination that the mobile wireless relay device is to re-participate in the first wireless multi-hop network, the mobile wireless relay device transmitting to the second core node wireless base station, using the wireless single-hop communication, a re-participation request to connect, using the wireless multi-hop communication, to the first core node wireless base station of the first wireless multi-hop network,
the second node wireless base station, responsive to the re-participation request, transmitting re-participation control signaling to the first core node wireless base station, and
the first core node wireless base station, responsive to the re-participation control signaling, supporting the wireless multi-hop communication with the mobile relay device.

12. The wireless communication method of claim 11,
wherein the determination to re-participate in the first wireless multi-hop network is based on environmental information of the mobile wireless relay device.

13. The wireless communication method of claim 12, wherein the determination to re-participate in the first wireless multi-hop network is made by the mobile wireless relay device or by the first core node wireless base station or by both the mobile wireless relay device and the first core node wireless base station.

14. The wireless communication method of claim 10,
wherein the mobile wireless relay device is configured to acquire environmental information of the mobile wireless relay device, and to repeatedly transmit, using the wireless multi-hop communication, the environmental information to the first core node wireless base station, and wherein the determination to withdraw from the first wireless multi-hop network is based on the environmental information.

15. The wireless communication method of claim 10, comprising:
after the mobile wireless relay devices withdraws from the first wireless multi-hop network, the first core node wireless base station re-configuring the first wireless multi-hop network.

16. The wireless communication method of claim 10, wherein the determination to withdraw from the first wireless multi-hop network is based on a determination that a delay time of the wireless multi-hop communication cannot meet an allowable latency requirement.

17. The wireless communication method of claim 10, wherein the determination to withdraw from the first wireless multi-hop network is made by the mobile wireless relay device or by the first core node wireless base station or by both the mobile wireless relay device and the first core node wireless base station.

18. A mobile wireless relay device configured to relay data which is transmitted from a wireless terminal, the mobile wireless relay device comprising:
processing circuitry configured to determine whether or not the mobile wireless relay device is to withdraw from a first wireless multi-hop network including a first core node base station and multiple wireless relay devices including the mobile wireless relay device; and
communication circuitry which, responsive to a determination that the mobile wireless relay device is to withdraw from the first wireless multi-hop network, transmits to the first core node wireless base station, using a wireless multi-hop communication, a request to connect, using a wireless single-hop communication, to a second core node wireless base station of a second wireless multi-hop network, and connects, using the wireless single-hop communication, to the second core node wireless base station.

19. The wireless relay device of claim 18, wherein
the processing circuitry, after the mobile wireless relay device withdraws from the first wireless multi-hop network, determines whether or not the mobile wireless relay device is to re-participate in the first wireless multi-hop network, and
the communication circuitry, responsive to a determination that the mobile wireless relay device is to re-participate in the first wireless multi-hop network, transmits to the second core node wireless base station, using the wireless single-hop communication, a re-participation request to connect, using the wireless multi-hop communication, to the first core node wireless base station of the first wireless multi-hop network, and connects, using the wireless single-hop communication, to the first core node wireless base station.

20. The wireless relay device of claim 18, wherein the determination that the mobile wireless relay device is to withdraw from the first wireless multi-hop network is based on a determination that a delay time of the wireless multi-hop communication cannot meet an allowable latency requirement.

* * * * *